United States Patent
Kotaki et al.

[11] Patent Number: 5,557,527
[45] Date of Patent: Sep. 17, 1996

[54] KNIT DESIGN SYSTEM AND A METHOD FOR DESIGNING KNIT FABRICS

[75] Inventors: Kenji Kotaki, Kishiwada; Hidekazu Kitada; Kiyoshi Minami, both of Wakayama, all of Japan

[73] Assignee: Shima Seiki Manufacturing Ltd., Wakayama, Japan

[21] Appl. No.: 295,555

[22] Filed: Aug. 25, 1994

[30] Foreign Application Priority Data

Aug. 31, 1993 [JP] Japan .................................. 5-240712
Aug. 31, 1993 [JP] Japan .................................. 5-240713
Aug. 31, 1993 [JP] Japan .................................. 5-240714
Aug. 31, 1993 [JP] Japan .................................. 5-240715

[51] Int. Cl.$^6$ ........................... G09F 19/00; D04B 9/46
[52] U.S. Cl. ................. 364/470.02; 66/232; 66/75.2; 364/470.12
[58] Field of Search .................... 364/470, 191, 364/192; 66/232, 237, 75.2

[56] References Cited

U.S. PATENT DOCUMENTS

| | | | |
|---|---|---|---|
| 4,608,642 | 8/1986 | Shima | 364/470 |
| 4,856,104 | 8/1989 | Stoll et al. | 364/470 |
| 5,319,565 | 6/1994 | Hausammann et al. | 364/470 |
| 5,388,050 | 2/1995 | Inoue et al. | 364/470 |

OTHER PUBLICATIONS

Leaflet of the assignee, entitled "SDS-300", published on Oct. 1, 1989.
Leaflet of the assignee, entitled "micro SDS", published on Mar. 25, 1991.

Primary Examiner—Roy N. Envall, Jr.
Assistant Examiner—Thomas E. Brown
Attorney, Agent, or Firm—Nikaido, Marmelstein, Murray & Oram LLP

[57] ABSTRACT

Each design data of intarsia, jacquard, and structural stitches is separately stored and independently processed. Each design data is stored in an internal data format where one pixel is allocated to each loop and is compensated for the aspect ratio of loops by affine transformation before being displayed on a monitor. Similarly input coordinates from a stylus are inputted in a coordinate system corresponding to the internal data format and then converted into monitor address with coordinate affine transformation.

17 Claims, 20 Drawing Sheets

COPY

FIG.18
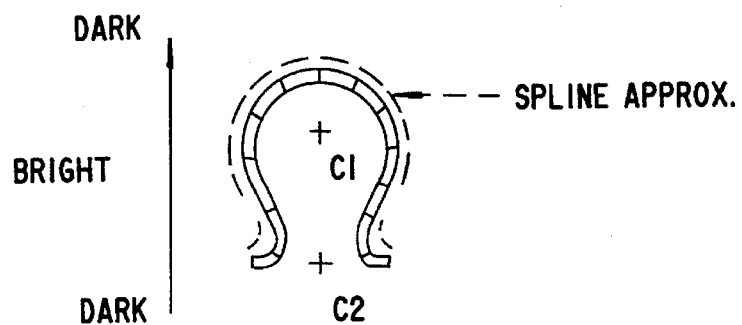
FIG.19(A)
FIG.19(B)
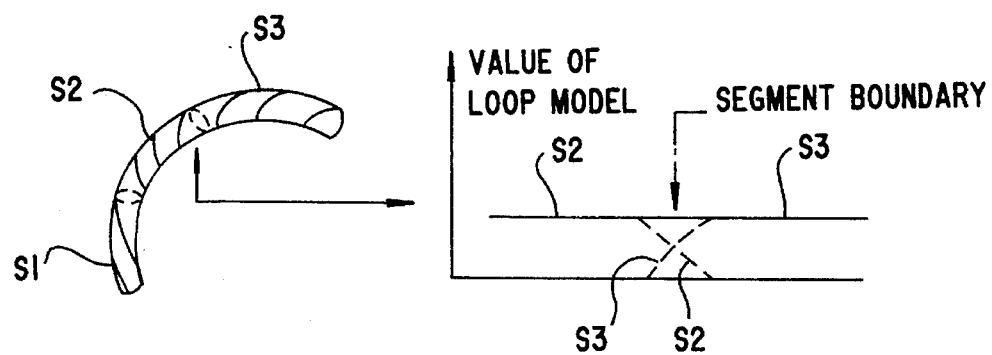

FIG.20(A)    FIG.20(B)    FIG.20(C)
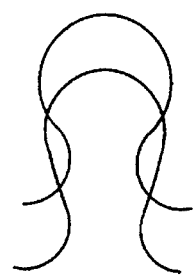
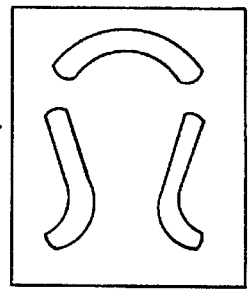
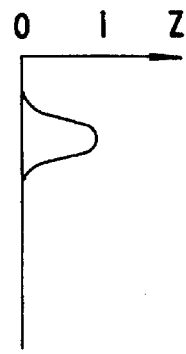
MASK FOR FORMER LOOP
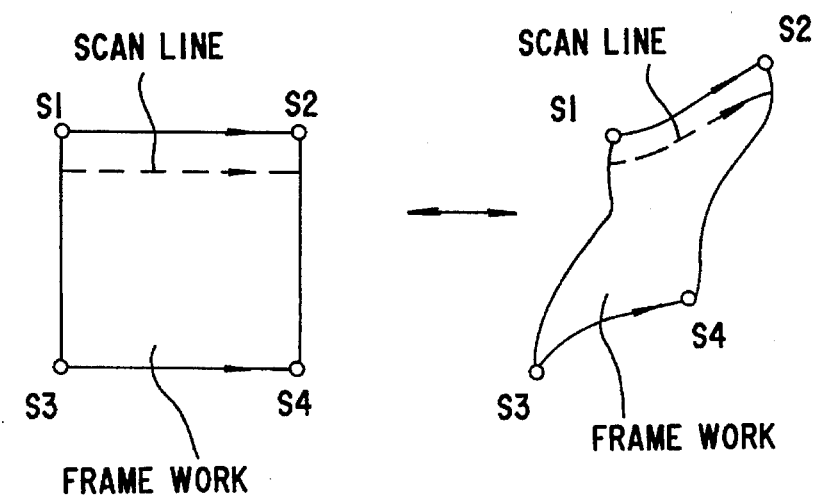
FIG.22(A)    FIG.22(B)

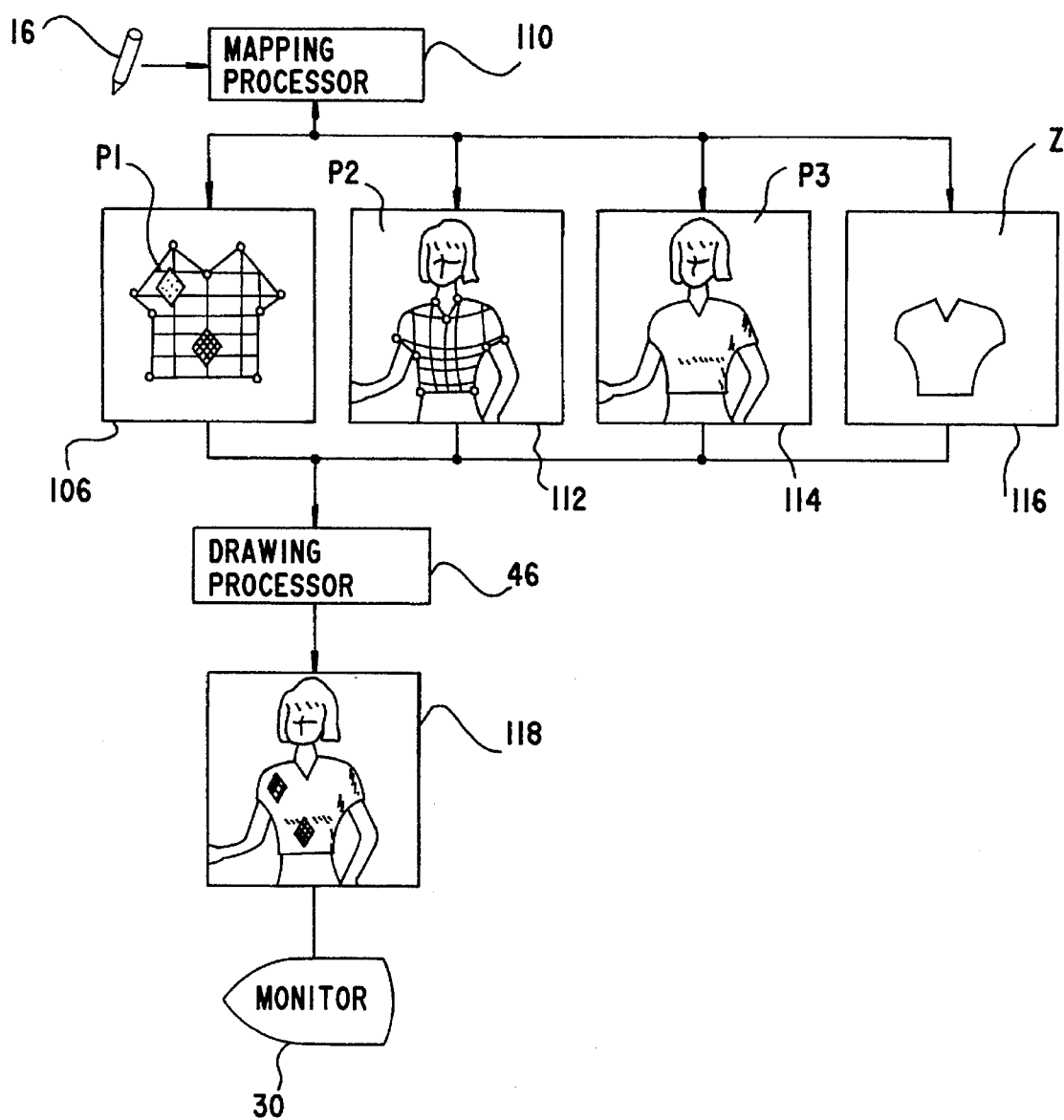

KNIT DESIGN SYSTEM AND A METHOD FOR DESIGNING KNIT FABRICS

FIELD OF THE INVENTION

The present invention relates to a knit design system and a method for designing knit fabrics. Knit fabrics refer not only to fashioned garments such as sweaters but to non-fashioned fabrics. Knit fabrics also refer to flat, warp, circular knitting and so forth.

PRIOR ARTS

The assignee has proposed a system for designing knit fabrics on the monitor screen (Japanese Patent Hei3-21661, corresponding U.S. Pat. No. 4,608,642). The system has a frame memory for recording knitting data in the course of designing. Each loop in the design corresponds to a pixel in the frame memory for example, and pixel colors represent the species of stitches. When the color space of the frame memory comprises 256 colors for example, each pixel may represent one of the 256 stitch types. The species of yarns are designated optionally for each stitch type. Once the design is completed, the system converts knitting data in the frame memory into control data for controlling knitting machines automatically with a look-up table for example.

The system records every data of intarsia, jacquard, and other stitch types about a loop as color data and stores them into one pixel in the frame memory. Therefore, individual data for intarsia, jacquard, and other stitch types may not be separately treated. It restricts flexibility of copying, moving, and deleting stitch data. For example, such individual data as cable pattern, pocket pattern, button hole pattern and so on, may not be separated from an original design or transferred into another design. Stitch data are recorded without distinction between stitch types, and design data are lost by copying unless all stitch data are copied. For example, the stitch patterns of intarsia or jacquard alone may not be copied from one design into another without copying all other data of the stitches.

Similar problems occur when copying, moving, deleting, or altering stitch data within a design. If pocket stitch data are recorded over an intarsia stitch pattern for example, the pocket has to be transferred with the intarsia pattern. Likewise, if the intarsia pattern is changed, the pocket stitch data will be lost. Since all data in designated pixels have to be deleted at the same time, it is impossible to delete only the pocket stitch data without altering other pattern data in the designated pixels. It further restricts flexibility of grading, since pockets or button holes may not be easily transferred or altered for example.

Since all data of a stitch such as intarsia, jacquard, and other stitch types are not separately stored, all stitch patterns have to be designed simultaneously. In other words, stitch patterns such as intarsia, jacquard, or others may not be designed separately. It gives a heavy load to designers.

Furthermore, the loops of knit fabrics have aspect ratios (slenderness ratios), and they are not square in general. Therefore, images displayed on a monitor have different appearances from the actual fabrics to be knitted. For example, on a monitor, a circle would be represented as if it were an ellipse; an ellipse would be represented circularly or even in a more distorted form; a square would be rectangular; and an equilateral triangle would be an isosceles triangle. Therefore, it is difficult to recognize a fabric design from a monitor image and it is especially difficult to copy or move stitch patterns. For example, when a design image of a sweater is distorted lengthwise on the monitor, it is difficult to find a suitable position for copying a pocket from the monitor image. Similarly, it is difficult to imagine from the distorted monitor image exactly how the actual position or size would be when a stitch pattern is copied.

SUMMARY OF THE INVENTION

The objects of the invention are;

1) making knit fabric design easier by separating its design data according to stitch species so that a designer may transact the separated data independently with each other, 2) masking internal data from a designer's eye which are stored in a frame memory without the compensation of the aspect ratio of loops so that the design data with the aspect ratio compensated are displayed on the monitor and retouched by a designer as if just the design data with the compensation were present, 3) making it easy to confirm the fitting between the separated data with the facility of composing them into a composite image, 4) reducing the load of designers for such tiresome jobs as polka dot pattern generation, repetition pattern generation, and straight line generation, 5) making it possible to evaluate designs without knitting real fabrics with the facility of simulating the designs accurately on the monitor and further evaluating the designs three dimensionally by putting the simulated design on virtual mannequins, 6) providing a system which integrates processes from designing knit fabrics to the virtual fitting on mannequins so that it is possible to design, evaluate, and immediately start the production of knit fabrics on the system.

According to the invention, a knit fabric is designed with its design image displayed on the monitor and stored in a frame memory, which may be retouched by an external input. The invention is characterized by the frame memory which stores at least two separate images into which the design images are divided according to stitch species. Preferably, the stitch species are divided into intarsia, jacquard, and structures, and separately stored in the frame memory. Preferably, the frame memory stores the separate images in a format which neglects the aspect ratio of loops in the designed knit fabric, and before being displayed on the monitor, the stored images are compensated for the ratio. Signals from an external input device are preferably displayed on the monitor after being compensated for their aspect ratio and at the same time stored in the frame memory without the compensation. It is preferable to provide the design system with a combiner for composing the separate images into a composite image to be displayed on the monitor.

According to the invention, design data may be independently treated by the stitch species. Therefore, structural stitch data which are the ones for stitches other than intarsia or jacquard, may be treated independently from other stitch data for example. Thus, structural stitch data may be separately preserved from other data, and such data alone may be copied from other designs. For example, pocket stitch pattern, button hole pattern, or special stitch patterns such as cable pattern, may be moved, copied, or deleted without considering other stitch data. Similarly, only intarsia pattern or jacquard pattern, for example, may be preserved, copied, moved, deleted, or modified without affecting other structural stitch patterns. Further, a designer is able to concentrate solely on an individual design, such as cable pattern and pocket stitch pattern, and is subsequently allowed to consider other patterns, such as intarsia or jacquard, that are overlaid on the individual design. He is allowed to concentrate just on intarsia pattern, jacquard pattern, or other patterns. All these are made possible by separating the patterns into two or three species.

The invention masks internal data of a knit fabric stored in the frame memory without their aspect ratio compensation from a designer's eye and it converts the internal data into monitor data by compensating their aspect ratio so that the monitor displays only the monitor data. With respect to the internal data, each loop is allocated to one pixel for example, and with respect to the monitor data compensated for their aspect ratio, each loop is represented by a quadrilateral which is comprised of plural loops and has an aspect ratio corresponding to the said aspect ratio. External input data for designing a knit fabric are inputted according to an internal coordinate format in the frame memory, and are displayed on the monitor according to monitor addresses into which the internal addresses are converted through the aspect ratio compensation. Of course, it is permissible to input the external data according to the monitor addresses and to convert them into the internal addresses for accessing the frame memory. Thus, the internal data and the internal address are masked, and designers may design with the monitor data and the monitor address.

Preferably the system is equipped with a combiner so that it is possible to combine the separate images into a composite image, and designers are allowed to observe both separate images and the composite image.

The invention includes as its sub-combination the aspect ratio compensation. The invention includes the display of the simulation image of a real knit fabric on the monitor created from the design image. The invention further includes the fitting on a virtual mannequin in the simulation image. The invention also includes the execution of processes on computer aided design systems from preparation of a dress pattern to the virtual wearing.

BRIEF DESCRIPTIONS FOR THE DRAWINGS

FIG. 18 is a characteristic diagram showing the synthesis of segments into a loop model.

FIG. 19 is a characteristic diagram showing the connection of segments in the loop model.

FIG. 20 is a characteristic diagram showing a mask for a former loop just one course before during the loop simulation.

FIG. 21 is a block diagram showing a mesh mapping unit.

FIG. 22 is a characteristic diagram showing the transformation of an image during the mesh mapping.

EMBODIMENT

Figure 1:
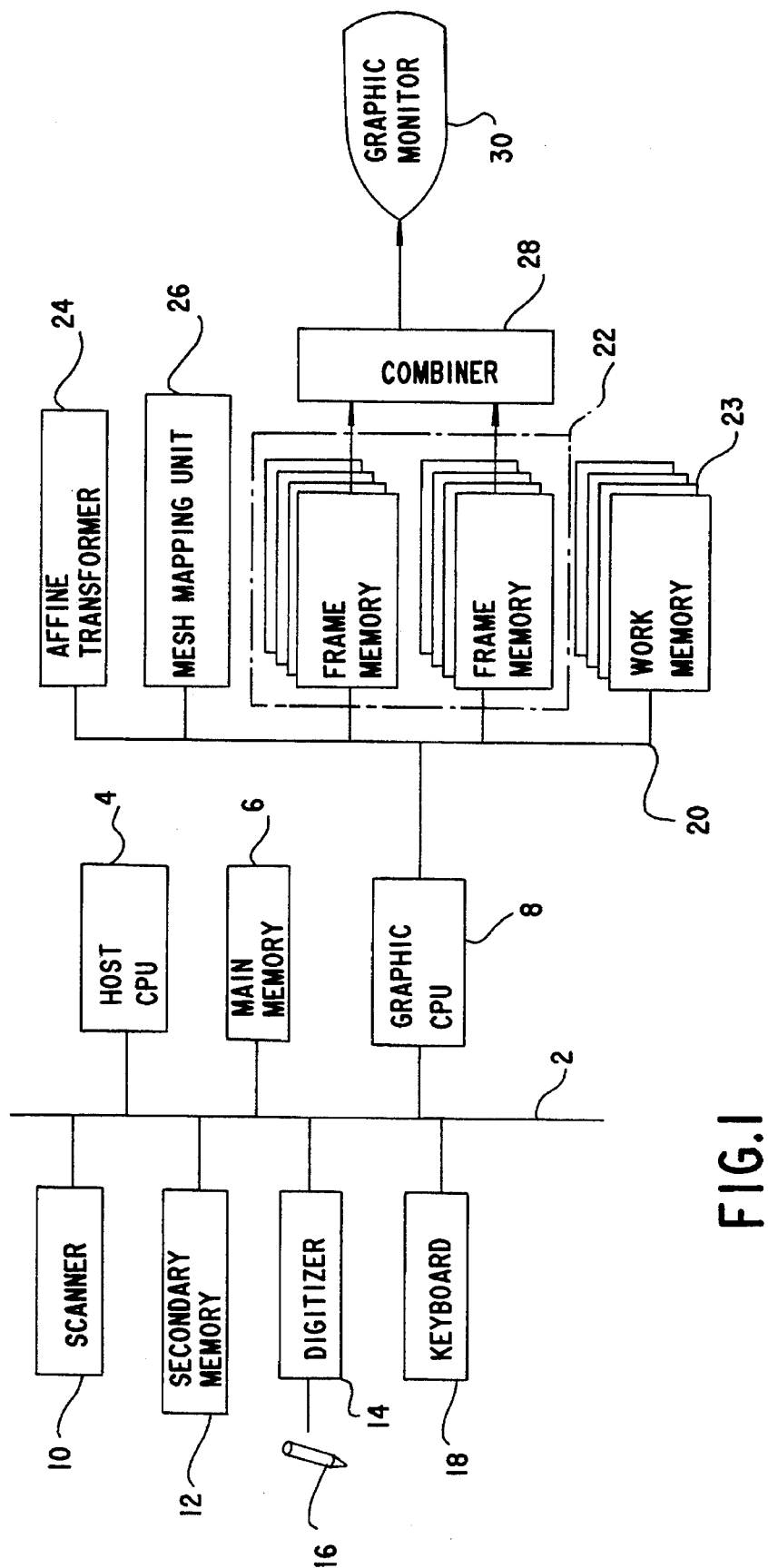
FIG. 1 is a block diagram of the knit paint system according to the embodiment.
Figure 23:
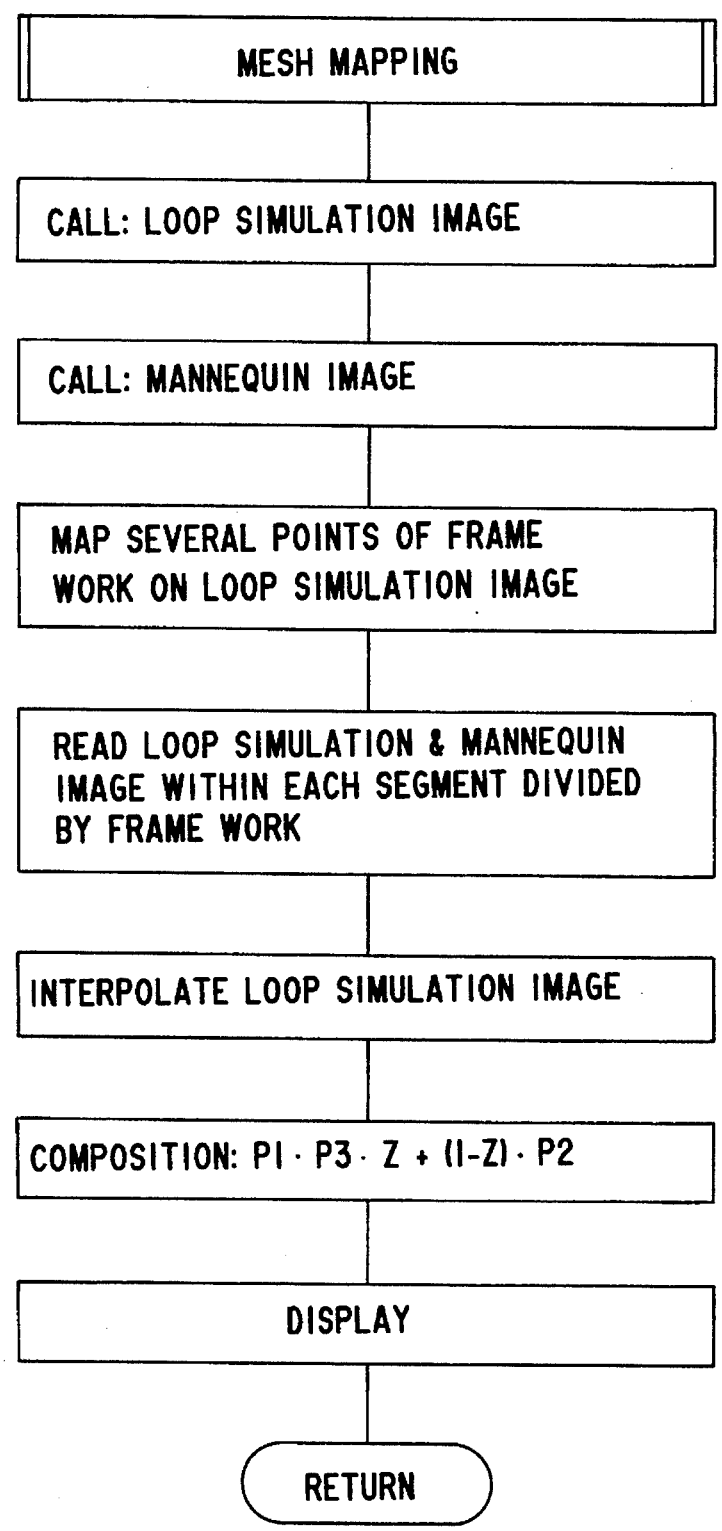
FIG. 23 is a flow chart for the mesh mapping.
Figure 24:
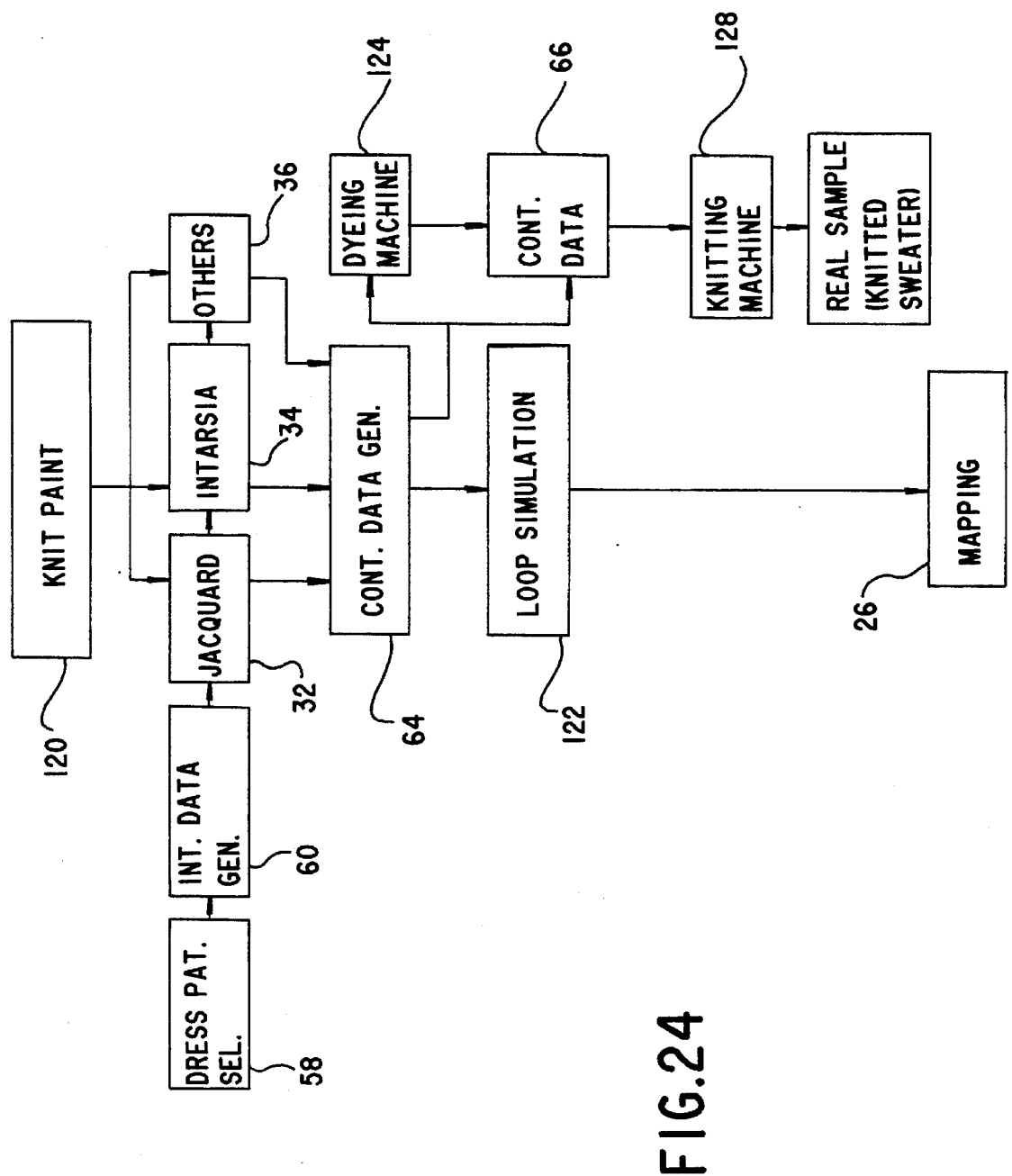
FIG. 24 is a block diagram showing the entire knit design system according to the embodiment.

FIGS. 1–24 show an embodiment; FIG. 1 shows the structure of hardware of a knit paint system in the embodiment, FIGS. 2–13 show the knit paint process before loop simulation, FIGS. 14–20 show the loop simulation process, FIGS. 21–23 show a mesh mapping process after the loop simulation, and FIG. 24 shows an entire knit design system. The hardware in FIG. 1 is transformed with software into the architecture shown in FIG. 2 and so on.

In FIG. 1, 2 denotes a main bus, 4 denotes a host CPU, 6 denotes a main memory, and 8 denotes a graphic CPU. The knit paint system is equipped with input or output devices such as a scanner 10, a secondary memory 12 such as floppy disks, hard disks and magneto optical recording disks, a digitizer 14, a stylus 16, and a key board 18. A graphic bus 20 is connected to the graphic CPU 8 and the bus 20 connects several planes of frame memories 22, a work memory 23, an affine transformer 24, and a mesh mapping unit 26 with each other. Image data in the frame memories 22 are combined by a combiner 28 and displayed on a graphic monitor 30.

Knitting data during design are stored in an internal data format in the frame memories 22 where each loop is allocated to one pixel. Likewise, working data in the course of designing such patterns as polka dots, straight line, and repetition are stored in the internal data format in the work memory 23. The affine transformer 24 converts the internal data into monitor data by compensating them for the aspect ratio of loops in a design, and the monitor data are stored in vacant regions in the frame memories 22. The affine transformation is a transformation from one address (x,y) into another address (ax+by+c, dx+ey+f), where c and f denote offset values for correcting offsets between the frame memories 22 and the graphic monitor 30. Since the transformer converts coordinate x into ax+by and coordinate y into dx+ey, it not only does horizontal or vertical stretches and reductions but oblique transformations and rotations. This feature makes it possible to compensate aspect ratios, even if the direction of a loop is oblique to the axial directions in the frame memories 22 or to the scanning direction in the graphic monitor 30. However, the minimum transformation required is a conversion from frame memory address (x,y) into graphic monitor address (ax,by), where b/a denotes the aspect ratio. A design image after the loop simulation is put on a virtual mannequin by the mesh mapping unit 26.

Figure 2:
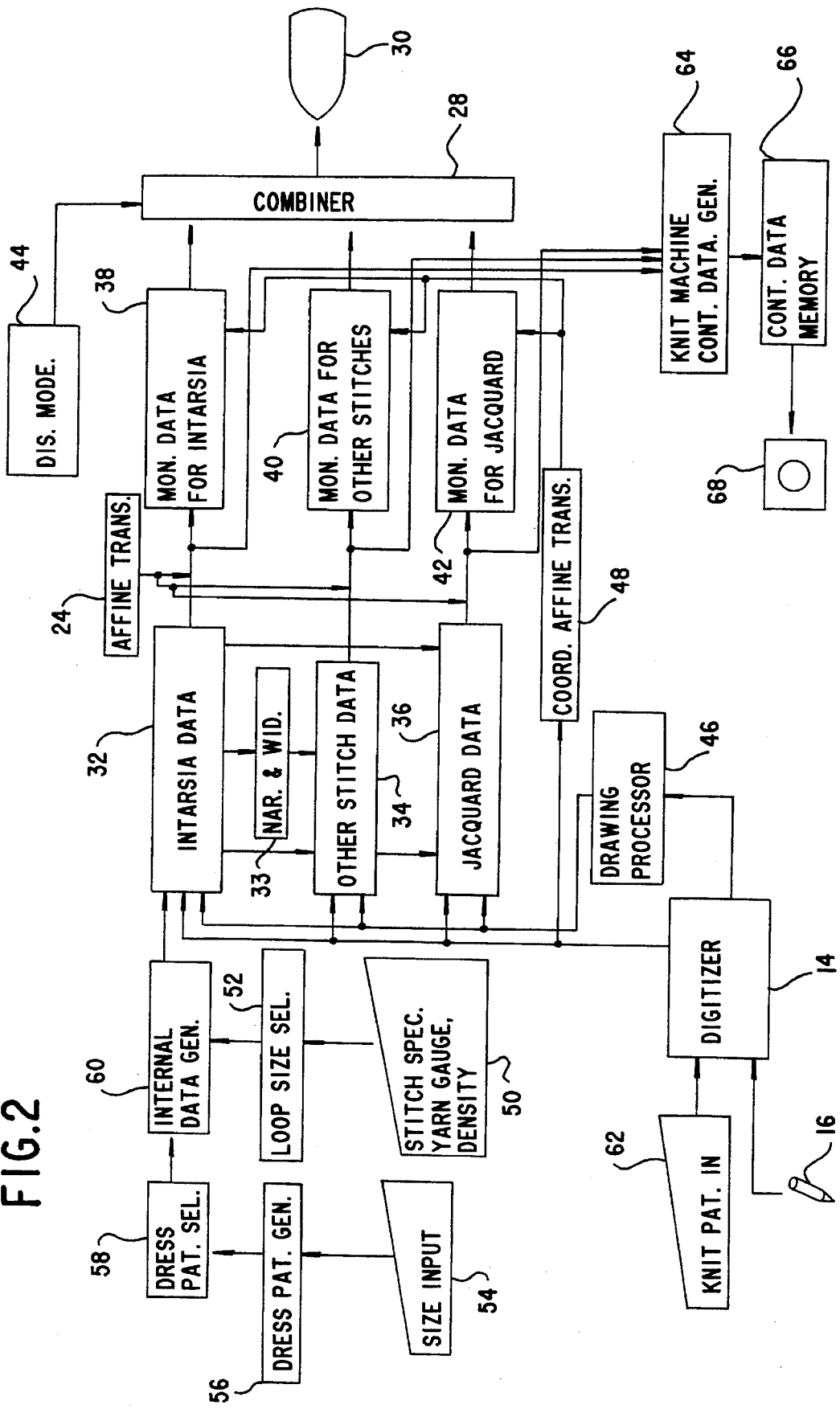
FIG. 2 is a block diagram showing the knit paint system in more detail.

FIG. 2 shows the knit paint system; 32 denotes an intarsia data storage region; 36 denotes a jacquard data storage region; and 34 denotes an structural stitch data storage region which stores stitch data other than those of intarsia or jacquard. Each region is allocated in the frame memories 22, and the data in the regions are stored in the internal data format. The embodiment separates knitting data into three species; namely, intarsia, jacquard, and structures, while knitting data have to be separately recorded by at least two species, that is, one of intarsia and jacquard, and others as another. 33 denotes a narrowing and widening data generator which generates narrowing and widening data from dress pattern data for adding them to outline data (the dress pattern data) stored in the intarsia data storage region 32. The resultant outline data are stored in the data storage region 34.

38, 40, and 42 denote monitor data storage regions for storing monitor data after the loop size correction by the affine transformer 24. These three regions are allocated within the frame memories 22. Region 38 is for intarsia data, region 42 is for jacquard data, and region 40 is for structural stitch data. These data are displayed on the graphic monitor 30, after being combined through the combiner 28 or bypassing the combiner 28. The combiner 28 is at least required to have the capability of combining two images, while it is desirable to have the capability of combining three images. The display mode of the graphic monitor 30, whether it shows a single image or the combined image, is determined by a display mode selector 44.

46 denotes a drawing processor, and 48 denotes a coordinate affine transformer which converts input coordinates from external input devices such as the stylus 16 into coordinates on the monitor 30. According to the embodiment, the external input devices designate input positions in an internal coordinate format which corresponds to the internal data, and they are converted into the monitor coordinates which correspond to the display on the monitor 30 with the coordinate affine transformer 48.

Denoted at 50 is a stitch species input realized by the key board 18 or secondary memory 12 for example, through which stitch species (intarsia, jacquard, and structures), the number of yarn types, gauge, and course and wale numbers are inputted. The gauge, and the wale and course numbers afford the aspect ratio of loops. Denoted at 52 is a loop size selector for determining loop sizes according to the stitch species and the course and wale numbers inputted, for example. Denoted at 54 is a size input for inputting the size data of a customer from the key board 18 or stylus 16, or for inputting dress pattern data recorded in the secondary memory 12 or scanned by the scanner 10. Denoted at 56 is a dress pattern generator for generating various dress pattern data according to the input data from the size input 54. A dress pattern selector 58 selects one of the dress pattern data. Denoted at 60 is an internal data generator which receives both loop size data from the loop size selector 52 and dress pattern data from the dress pattern selector 58, and generates the internal data wherein each loop corresponds to one pixel, then stores them into the data storage regions 32, 34, and 36 respectively.

When inputting knitting patterns into a knit fabric design, the patterns are inputted through the stylus 16 or a knitting pattern input 62 which facilitates retrieval of knitting pattern data stored in the secondary memory 12 or read by the scanner 10. The input coordinates for a knitting data are designated by the stylus 16 and the digitizer 14, and are registered in the internal coordinate format that corresponds to the internal data while being displayed according to its monitor address after the loop size correction. The drawing processor 46 transacts the input data and writes the processed data into the data storage regions 32, 34, and 36 according to their internal addresses. The coordinate affine transformer 48 converts the internal address designated by the digitizer 14 into the monitor address corresponding to the monitor data storage regions 38, 40, and 42 for the display on the monitor 30.

The conversion from the monitor data into the internal data by reverse affine transformation is not preferable. Because the internal data are the base of knitting machine control data, and their precision should be preferred to the display.

Denoted at 64 is a knitting machine control data generator for converting the internal data into knitting machine control data for the automatic control of knitting machines. The Japanese Patent Hei3-21661, corresponding to U.S. Pat. No 4,608,642 discloses the transformation of internal data into the knitting machine control data, where the internal data comprise color data for stitch species of loops and optional data for other than stitch species. For performing the transformation the optional data are produced from the internal data of the present invention, since the yarn species which comprises the optional data may be specified by intarsia, jacquard, and the other stitch data. The internal data according to the prior patent are produced from the intarsia, jacquard, and structural stitch data of the embodiment by compressing them into one plane of an image. Then they are converted into the knitting machine control data. Denoted at 66 is a memory for storing the knitting machine control data, and denoted at 68 is a floppy disk for storing the control data. Of course, other methods of conversion into the knitting machine control data are also acceptable.

Figure 3:
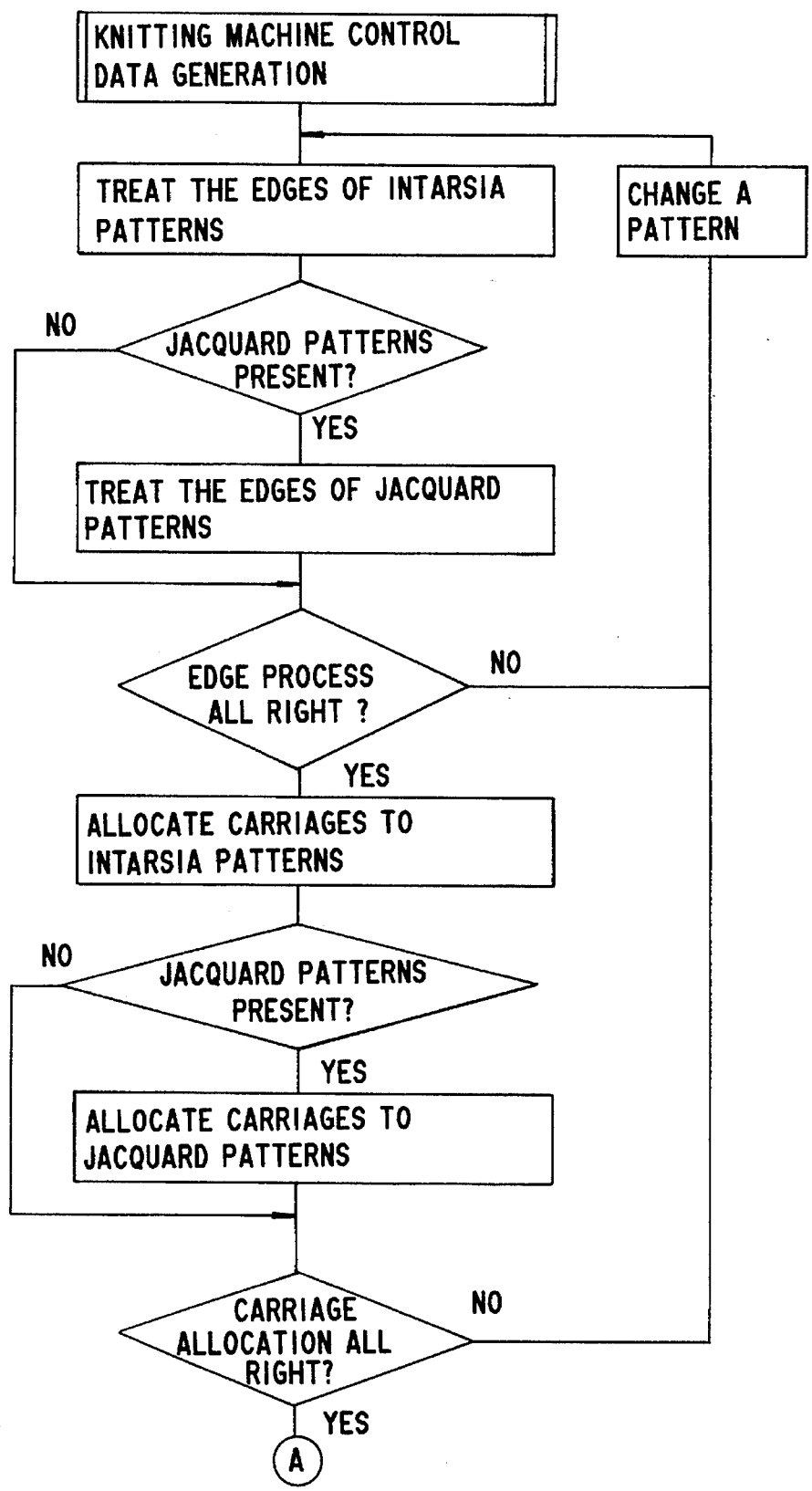
FIGS. 3 and 4 are flow charts showing the algorithm for translating internal data into knitting machine control data.
Figure 4:
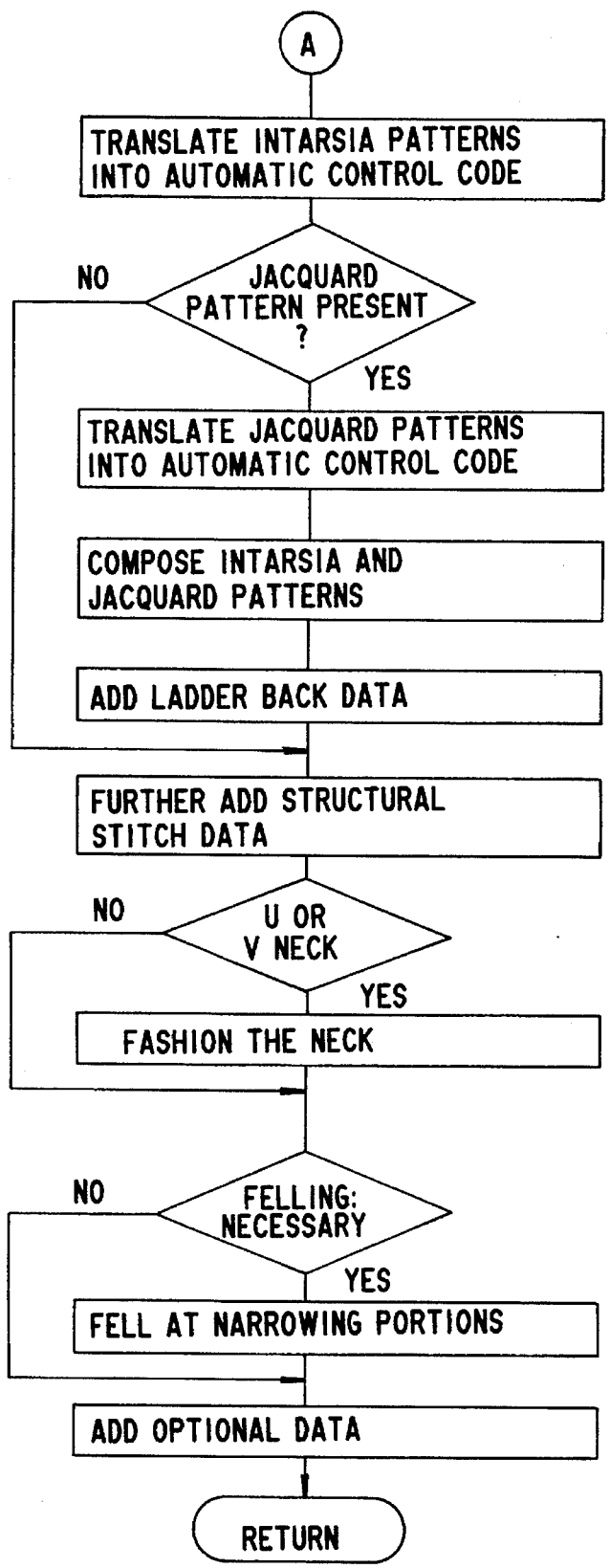
Figure 5:
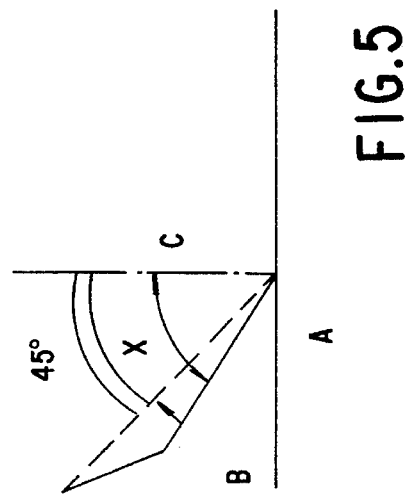
FIG. 5 is a diagram showing an example of edge treatment.

FIGS. 3–5 show the translation of internal data into the knitting machine control data. Each data of intarsia, jacquard, and structure comprises 8 bits, and the intarsia data is just a drawing data which represents an intarsia pattern. Whether a stitch of intarsia or jacquard is face or back is stored in the data storage region 34 with allocating one bit to it. The structural data in the data storage region 34 comprises those of knitting, tucking, missing, racking, face or back, and so on, and access only to the data storage region 32 or 36, and access both to the data storage region 32 or 36 and to the bit which stores face or back data in the data storage region 34 are allowed.

As shown in FIG. 3, edges of intarsia patterns and jacquard patterns are treated for detecting an edge which makes knitting difficult, so that the edge is changed into another edge being without difficulty in knitting. FIG. 5 shows an example of edge alteration, where A, B, and C represent each pattern, an edge shown by a solid line between patterns B and C has an angle X from wale direction larger than 45 degrees, and the edge makes knitting difficult. Therefore the edge is altered into another edge shown by a broken line whose direction from the wale axis is not larger than 45 degrees. After the edge treatment, carriages are allocated. If too many carriages are requested for allocating them to a knitting machine, or if a satisfactory alteration of edges is impossible, an alarm is indicated on the monitor 30 for requesting the designer to alter his intarsia or jacquard design.

As shown in FIG. 4, after the edge treatment and the carriage allocation, intarsia patterns and jacquard patterns are converted into control codes for a knitting machine. For example, intarsia patterns are translated into plain stitches within the patterns, and edges of intarsia patterns are detected by the variations in colour data in the data storage region 32 for translating them into tuck positions. Similarly, jacquard patterns are translated into the control codes. When a jacquard pattern is present over an intarsia pattern, the intarsia pattern under the jacquard pattern is translated into miss positions, and data of ladder back for supporting an intarsia yarn behind the jacquard pattern is added. Subsequently, structural data are composed into the jacquard and intarsia data so that the intarsia and jacquard patterns are specified as to face or back and that special stitch patterns such as cable stitch patterns and button hole patterns are overwritten onto the intarsia and jacquard data.

Then a U neck or a V neck is detected so that felling operation is done at a U neck and that separation is done at a V neck. If felling is necessary at a narrowing portion, felling is added at the portion. Then optional data are added, if necessary, and the resultant one plane data are converted into a knitting machine control data according to the Japanese Hei3-21661 patent.

Figure 6:
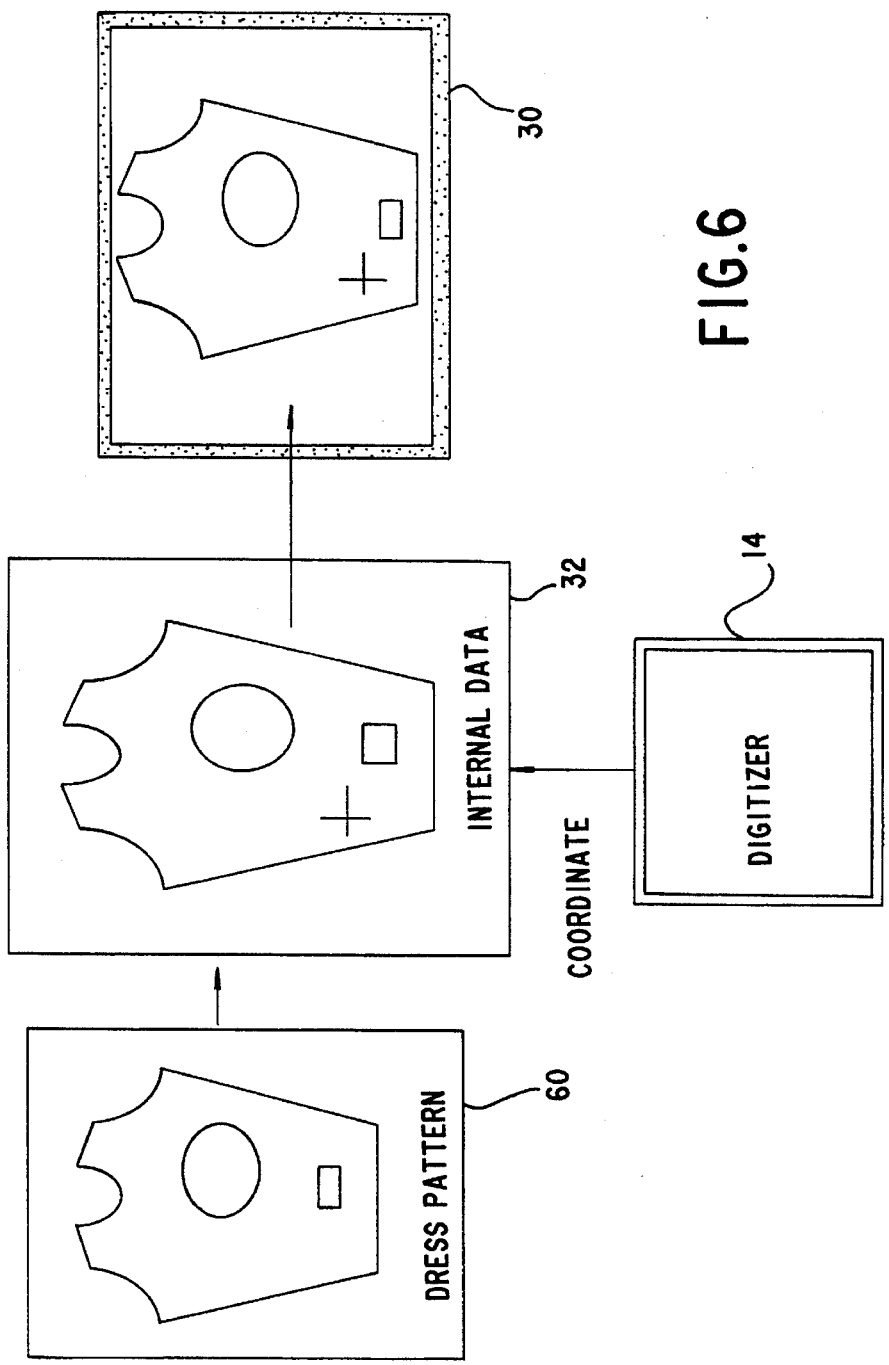
FIG. 6 is a characteristic diagram showing the relation between dress pattern data, internal data, and monitor data for a knit design.

FIG. 6 shows the relationship between the dress pattern data, the internal data, and the monitor data. The internal data generator 60 provides the dress pattern data shown on the left side of the figure. The corresponding internal data are distorted as shown at the center of the figure, since no aspect ratio is compensated, and they are stored in the data store region 32, 34, and 36. The distorted internal data are compensated for the aspect ratio by the affine transformation, and the resultant monitor data are shown on the monitor 30. The cross mark in the figure represents a cursor position designated by the stylus 16, and the position is inputted according to the internal coordinate format and is transformed by the coordinate affine transformation into the monitor coordinate format for displaying the cursor on the monitor 30. Therefore, designers may design without considering the internal data or the distorted image.

Figure 7:
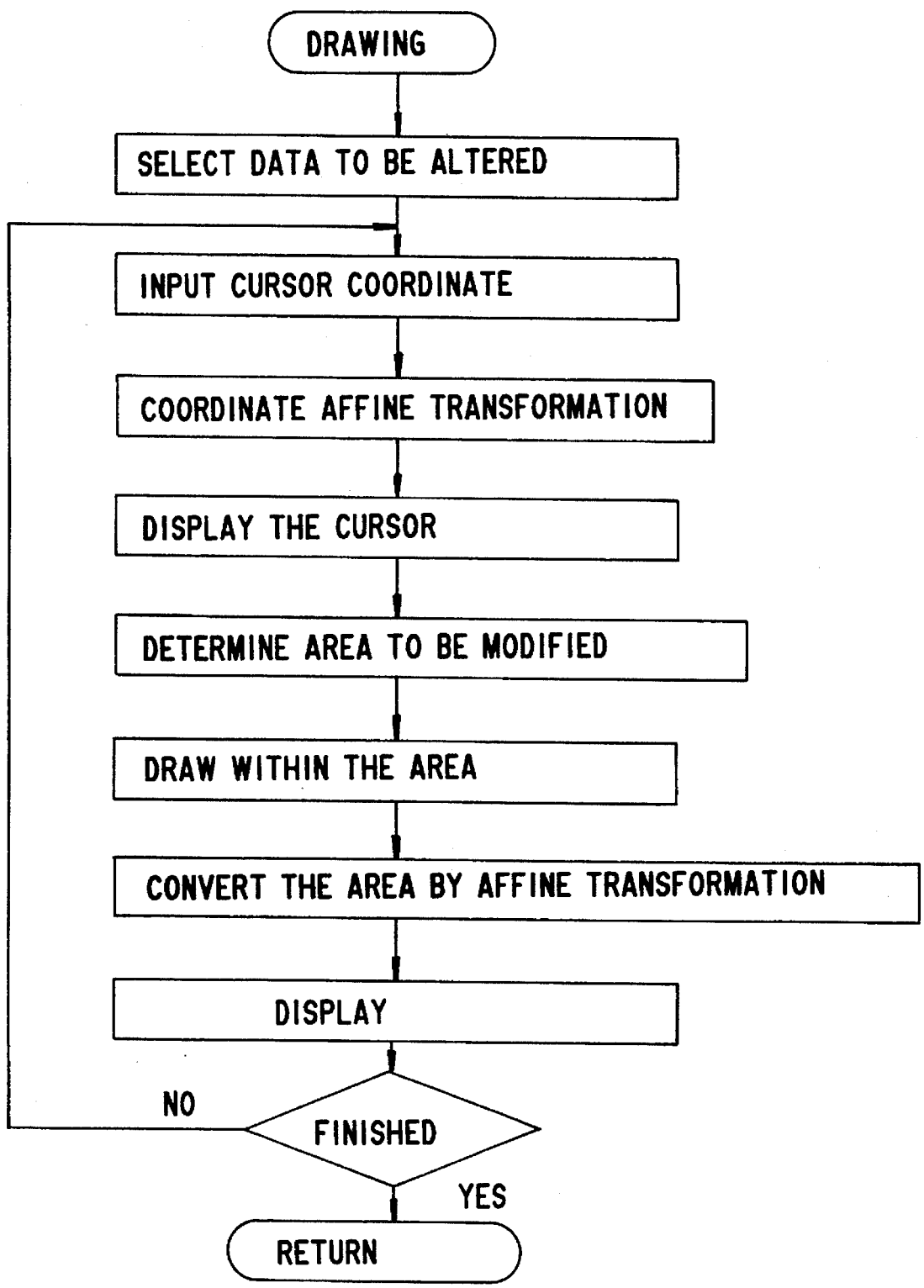
FIG. 7 is a flow chart showing coordinate conversion during design.

FIG. 7 shows an algorithm both for the compensation of loop sizes and the coordinate affine transformation of cursor positions. A designer is requested to select data to be altered or inputted among intarsia, jacquard, and structures using the display mode selector 44. After the selection, the relevant design image is shown on the monitor 30, stylus positions are converted into internal addresses, and the internal addresses are transformed by the coordinate affine transformation into monitor addresses for displaying cursor marks on the monitor 30. The designer determines an area to be modified or inputted and modifies or inputs a design image within the area with the stylus 16 for example. The design image within the area is stored in the work memory 23 in the internal data format. When the design image modified or inputted is satisfactory, the image is transferred into the data storage region 32, 34, or 36 from the memory 23 under the control of the drawing processor 46. During the design, the internal data in the work memory 23 are transformed with the affine transformer 24 into monitor data and are transferred into the data storage region 38, 40, or 42 for displaying on the monitor 30.

Figure 8:
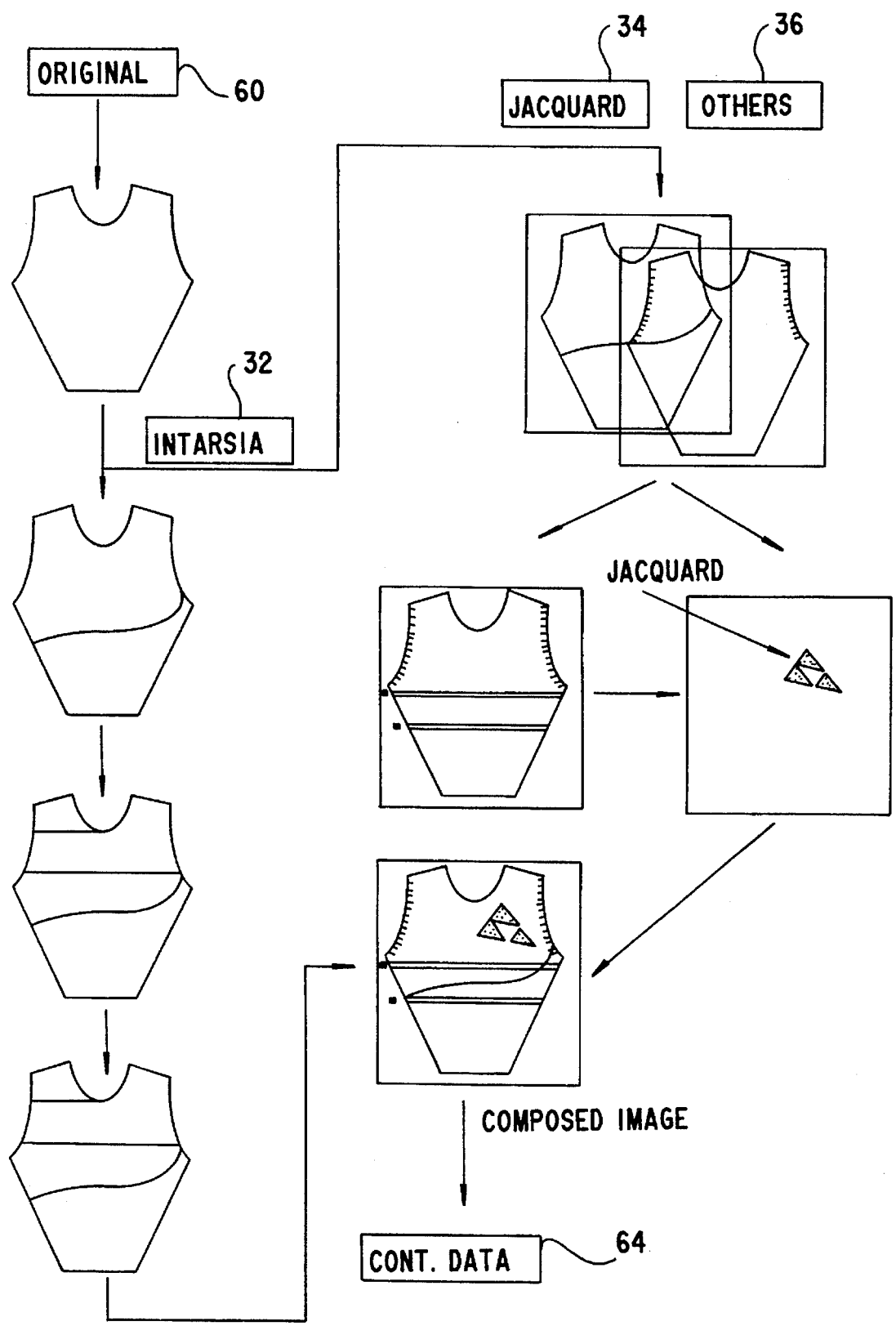
FIG. 8 is a characteristic diagram showing the relation between three planes of data; those of intarsia, jacquard, and structural stitches.

FIG. 8 shows the composition of intarsia, jacquard, and structures. The monitor data, after the loop size compensation, are shown in FIG. 8 and in the subsequent figures, since the internal data and the internal addresses are masked from a designer's eye by the algorithm shown in FIG. 7. The two streams of process are required; one is in the internal data format and the other is in the monitor data format. The internal data are processed and stored every time a designer confirms the process on the monitor 30.

Original images provided from the internal data generator 60 are separately stored in the data storage regions 32, 34, and 36 with discrimination between intarsia, jacquard, and structures or between intarsia and structures. They are independently modified by the drawing processor 46 so that a designer in the course of intarsia design may concentrate on it without considering other designs. Likewise, he/she may concentrate on structural stitch design such as cable pattern without considering intarsia or jacquard design. Consequently, intarsia data, jacquard data, and structural data may be separately designed and independently copied, moved, deleted, or modified. Stitch patterns for pockets or structural patterns such as cable stitch pattern may be separately copied from other designs. An intarsia pattern or a jacquard pattern alone may be copied from other designs and may be moved, deleted, enlarged, or reduced independently.

As shown in FIG. 8, the relative position of a jacquard pattern, for example, to other patterns in a design may be easily confirmed by composing the images in the data storage regions 34 and 36. Similarly the relative position of an intarsia pattern to other patterns may be confirmed by the composition of image data stored in the regions 32 and 34. Since each image is displayed on the monitor according to the monitor data format after the loop size compensation, transactions such as copy, move, reduction, and enlargement are easy. For example, when moving a jacquard one point mark shown on the composite image in FIG. 8, it is difficult to find an adequate position to move the mark with the internal data image which is not compensated for the loop size. Transfer or copy of the mark becomes a tiresome job, since it is difficult to envisage an image after the copy or move. In contrast to this, the display on the monitor 30 after the aspect ratio compensation is analogous to the real fabric to be knitted, showing a real mark position in the knit fabric, thus it makes easy to realize the design image of the mark. After the modification of designs, the three species of data are converted into one with a look up table for example, and they are further converted into the knitting machine control data by the control data generator 64.

Figure 9:
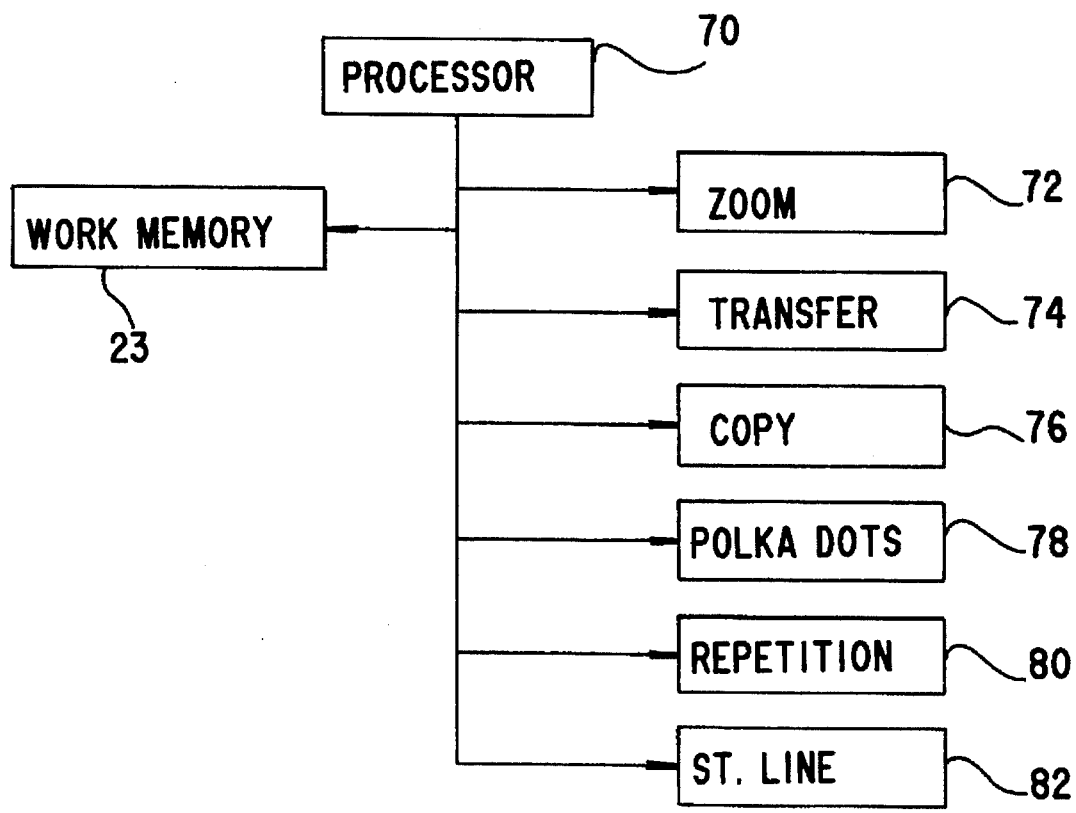
FIG. 9 is a block diagram showing the internal blocks of the drawing processor in FIG. 2.

FIG. 9 shows the drawing processor 46 and its functions for generating polka dots, repetition, and straight line patterns. In the figure, denoted at 70 is a processor; denoted at 72 is a zoom unit; 74 is a transfer unit; 76 is a copy unit; 78 is a polka dots unit; 80 is a repetition unit; and 82 is a straight line unit. These units 72, 74, 76, 78, 80 and 82 do their jobs with the aid of the processor 70 and write the processed data into the data storage regions 32, 34, and 36. The zoom unit 72 enlarges or reduces inputted patterns, the transfer unit 74 moves the patterns. The copy unit 76 copies inputted patterns into other portions of the data storage regions 32, 34, and 36. The architecture for these units 72, 74 and 76 has been well known in the field of general purpose paint systems.

Figure 13:
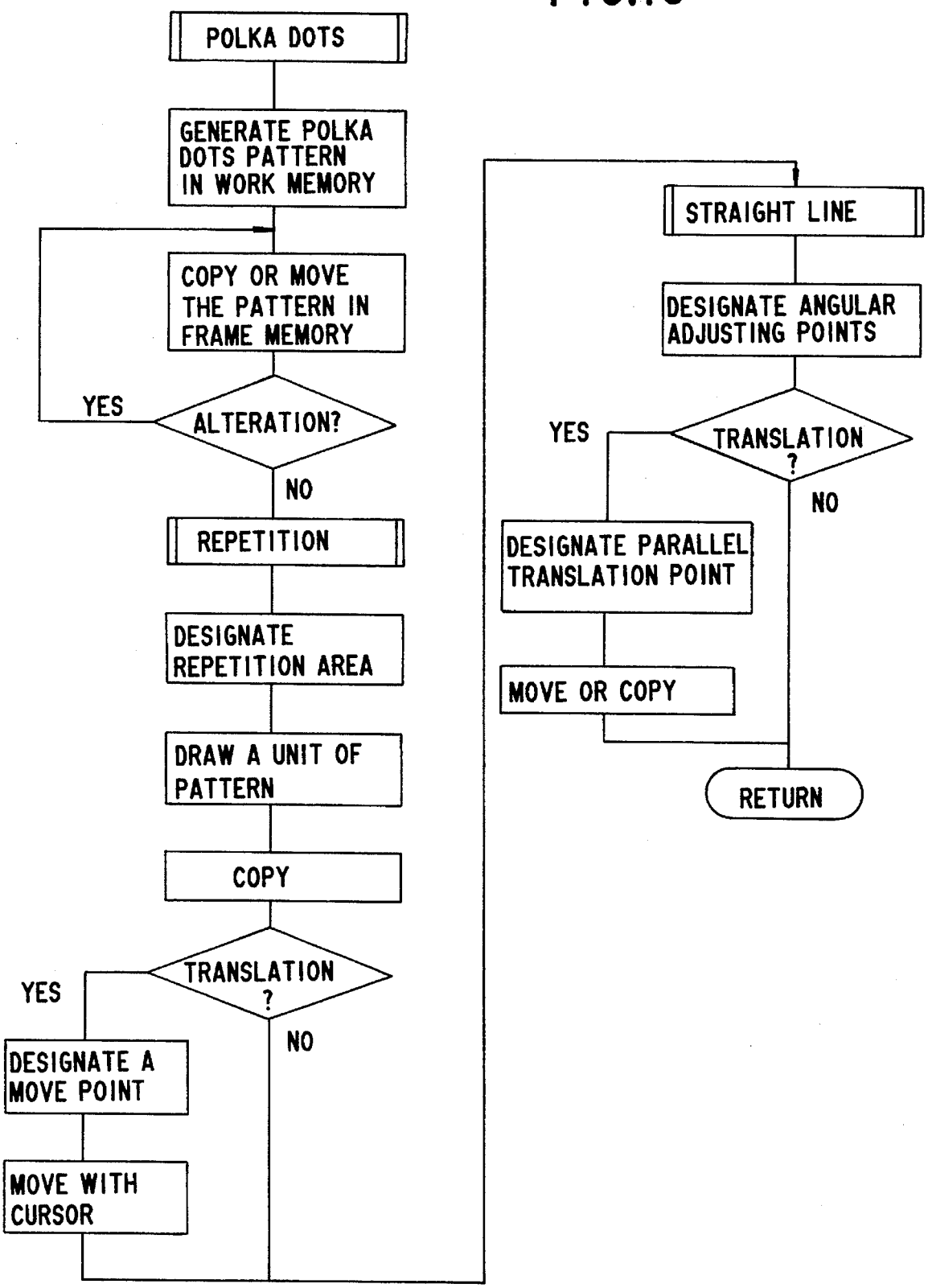
FIG. 13 is a flow chart showing the process for generating the patterns of polka dots, repetition, and straight line.

FIG. 13 shows an algorithm for creating polka dots, repetition, and straight line. The following is a supplemental explanation on the algorithm. When a color is designated to draw an outline of a polka dot pattern or a straight line pattern, internal area within the outline may be filled with either the designated color or another color. Therefore, once the outlines of patterns are drawn, it is easy to draw within the outlines. If moving a pattern to another position, data at the source position may be blank. In that case, however, by just specifying the same color as that of the surrounding area, the source position may be filled with the surrounding data. Colors of the intarsia and jacquard images represent the types of knitting yarn, while colors of structural stitches represent the types of stitches in which the same types of yarn is used as specified in the intarsia image for example. Therefore, stitch species and yarn species are designated by the colors to draw the images on the monitor 30.

Figure 10:
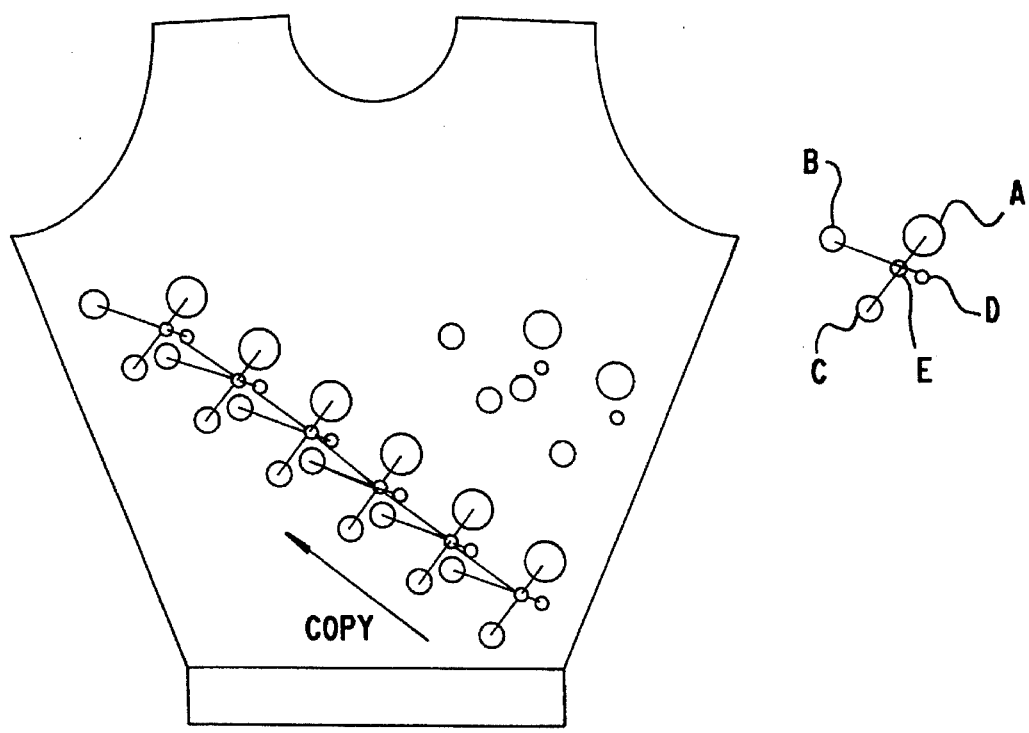
FIG. 10 is a characteristic diagram showing polka dot pattern generation according to the embodiment.

FIG. 10 shows the function of the polka dots unit 78. When designing a polka dot pattern, it is tedious to draw several dots with the stylus 16 and to copy each dot with the copy unit 76. According to the embodiment, circles A, B, C, and D, and a standard point E are inputted as shown at the right side of the figure. The circles A–D are the elements of a polka dot pattern and the point E is a standard point for moving or copying the circles A–D at the same time. Lines between the point E and the circles A–D are called control bars which represent that the circles A–D are control led by the point E. Data for the circles A–D, the point E, and the control bars are stored in the work memory 23 according to the internal data format and are converted by the affine transformation for the display. Cursor positions are also stored in the internal coordinate format and are displayed on the monitor after the coordinate affine transformation. By designating a new standard point on the monitor 30, around which the polka dot pattern is to be copied, the polka dots A–D are copied based on the internal address of such newly designated standard point which corresponds to the point E. The standard point E and the control bars are not copied.

Figure 11:
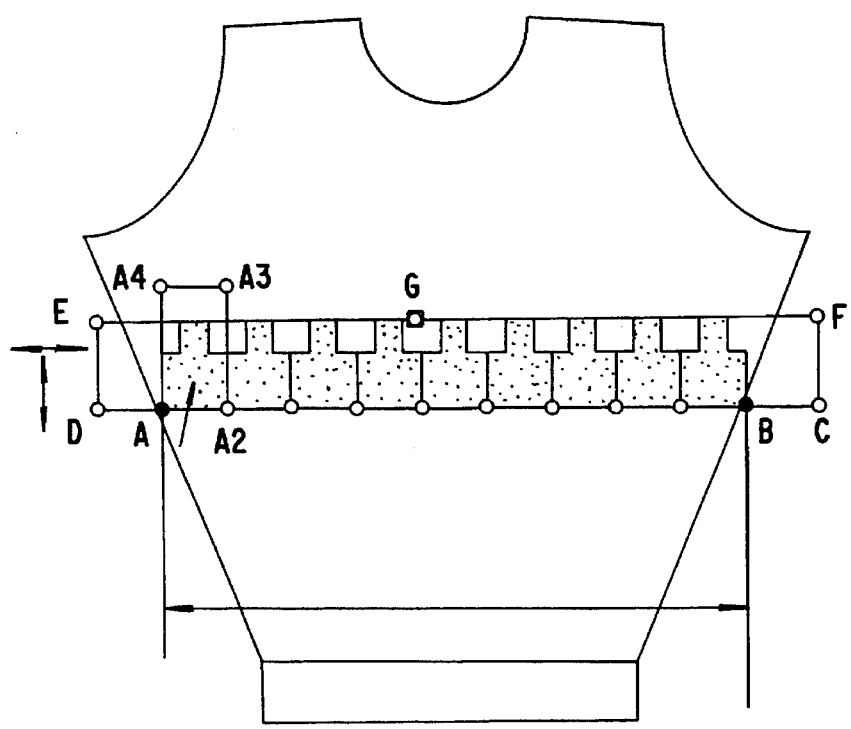
FIG. 11 is a characteristic diagram showing repetition pattern generation according to the embodiment.

FIG. 11 shows the function of the repetition unit 80. In the figure, points C, D, E, and F designate a repetition area in which a pattern is to be repeated. And points A and B are intersections between the repetition area and the outline of a knit fabric design. Points A, A2, A3, and A4 designate a unit of a repetition pattern, and in this case, the distance between points A and A2 is the width of the unit. A designer inputs one unit of the pattern within the area specified by the points A, A2, A3, and A4 with the stylus 16 for example, then the repetition unit 80 picks up the area C, D, E, and F and copies the unit within the area repeatedly. Thus, the pattern inputted for one unit is repeatedly and precisely copied. G is a move point marked within the repetition area by the stylus 16 for example, and the pattern within the area is moved or copied along with the movement of the point G. The repetition unit 80 transacts relevant data according to the internal data format and cursor positions in accordance with the internal coordinate format, and it stores the processed data into the data storage regions 32, 34, and 36 in the internal data format. On the other hand, the monitor 30 shows monitor data after the affine transformation and cursor positions after the coordinate affine transformation.

Figure 12:
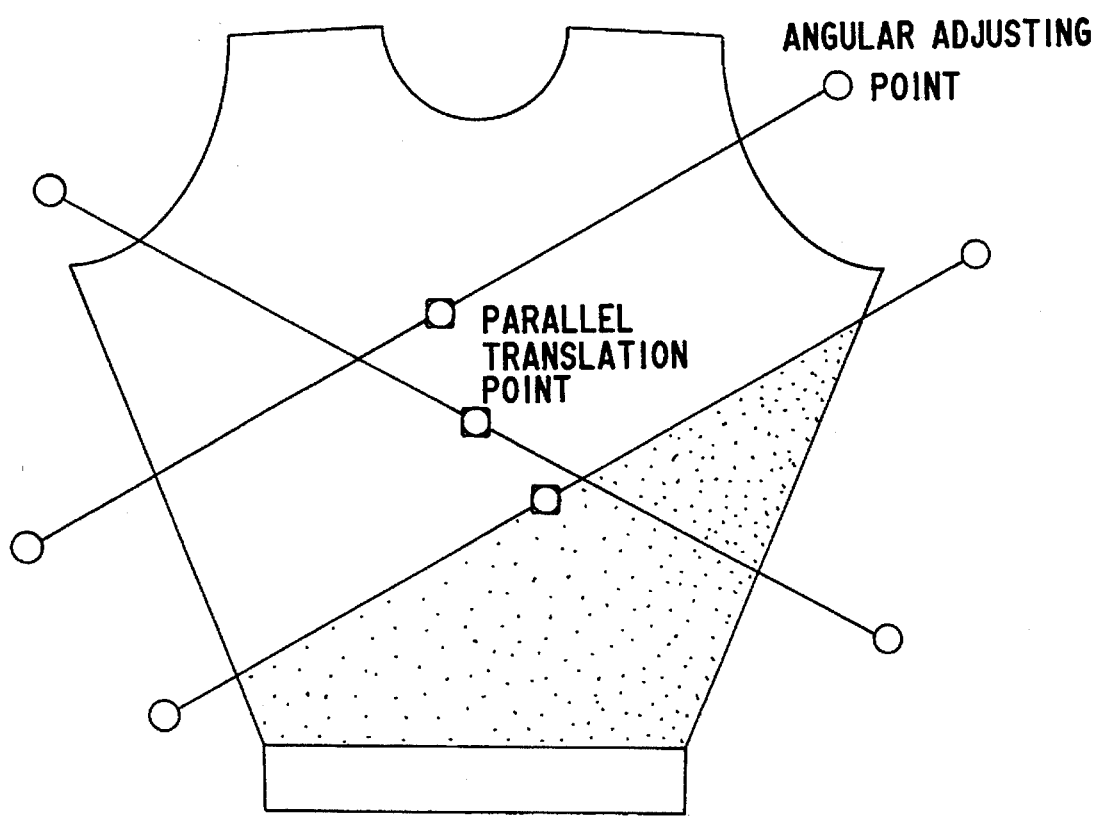
FIG. 12 is a characteristic diagram showing straight line pattern generation according to the embodiment.

FIG. 12 shows the function of the straight line unit 82. It is difficult to draw straight lines with little aliasing using the stylus 16. So the unit 82 requires its operators to designate two angular adjusting points, then it interpolates between the two with a straight line. The data of the angular adjusting points are stored in the work memory 23, and a straight line which fits most well with the vector between the two angular adjusting points is generated as the least aliased line. As the repetition unit 80 allows move and copy of patterns, a line generated by the straight line unit 82 may be moved or copied by designating a parallel translation point on the line and a new point to which the line is to be moved or copied. The straight line unit 82 processes relevant data in the work memory 23 and the data storage regions 32, 34, and 36 in accordance with the internal data format, while they are displayed on the monitor 30 with the monitor data format after the affine transformation.

Figure 14:
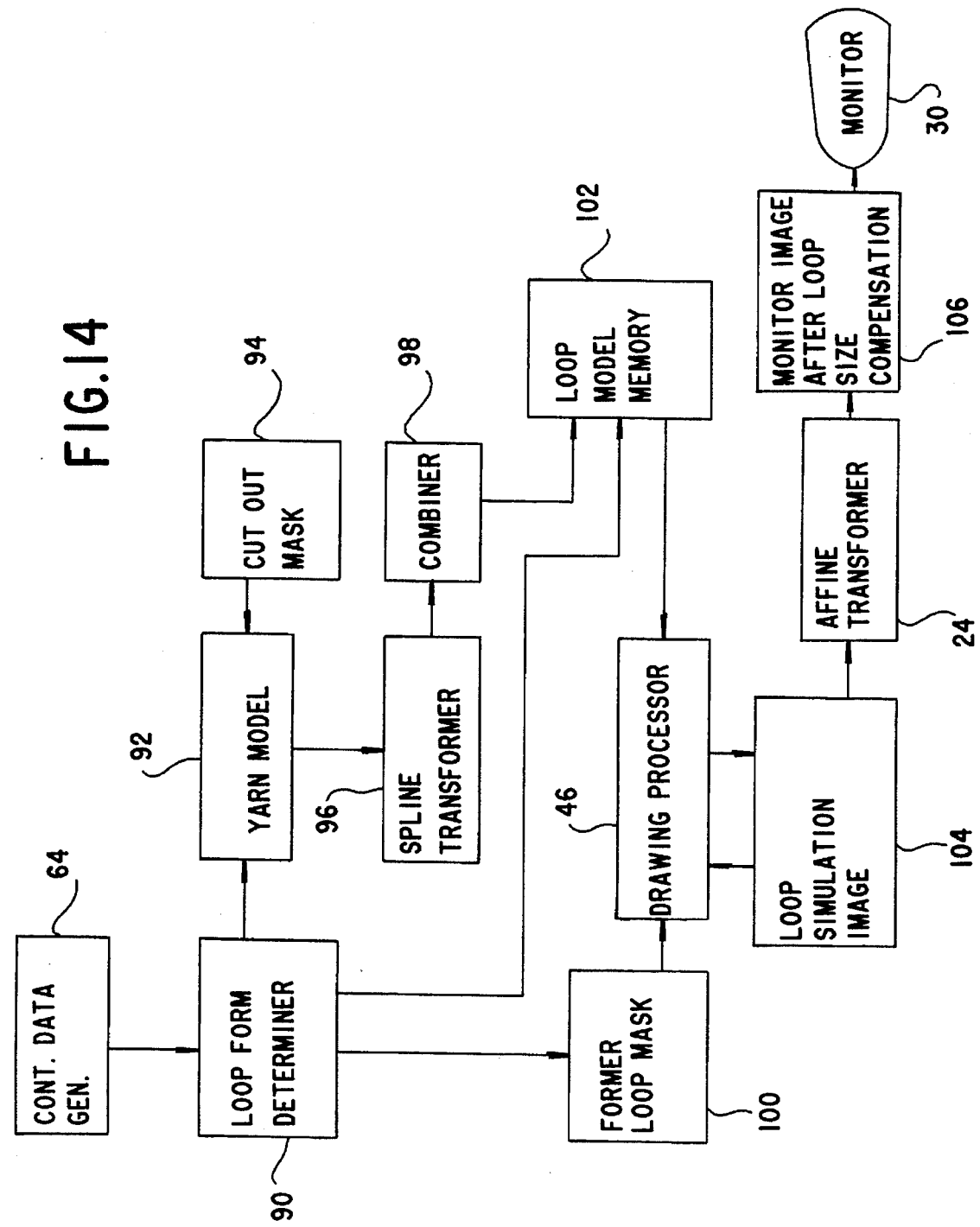
FIG. 14 is a block diagram showing a loop simulator.

FIGS. 14–20 show a loop simulation process and the system for the simulation. FIG. 14 shows the architecture of the simulation system comprising the hardware shown in FIG. 1 and necessary software. In FIG. 14, denoted at 90 is a loop form determiner for analyzing loop forms, shading values along loops, yarn species, and overlap between a present loop and a former loop just one course before, and all these data are provided by checking the knitting machine control data with the control data generator 64. The analysis is done by each loop along a knitting course, and when one course analysis is finished, the next course is analyzed.

Figure 17:
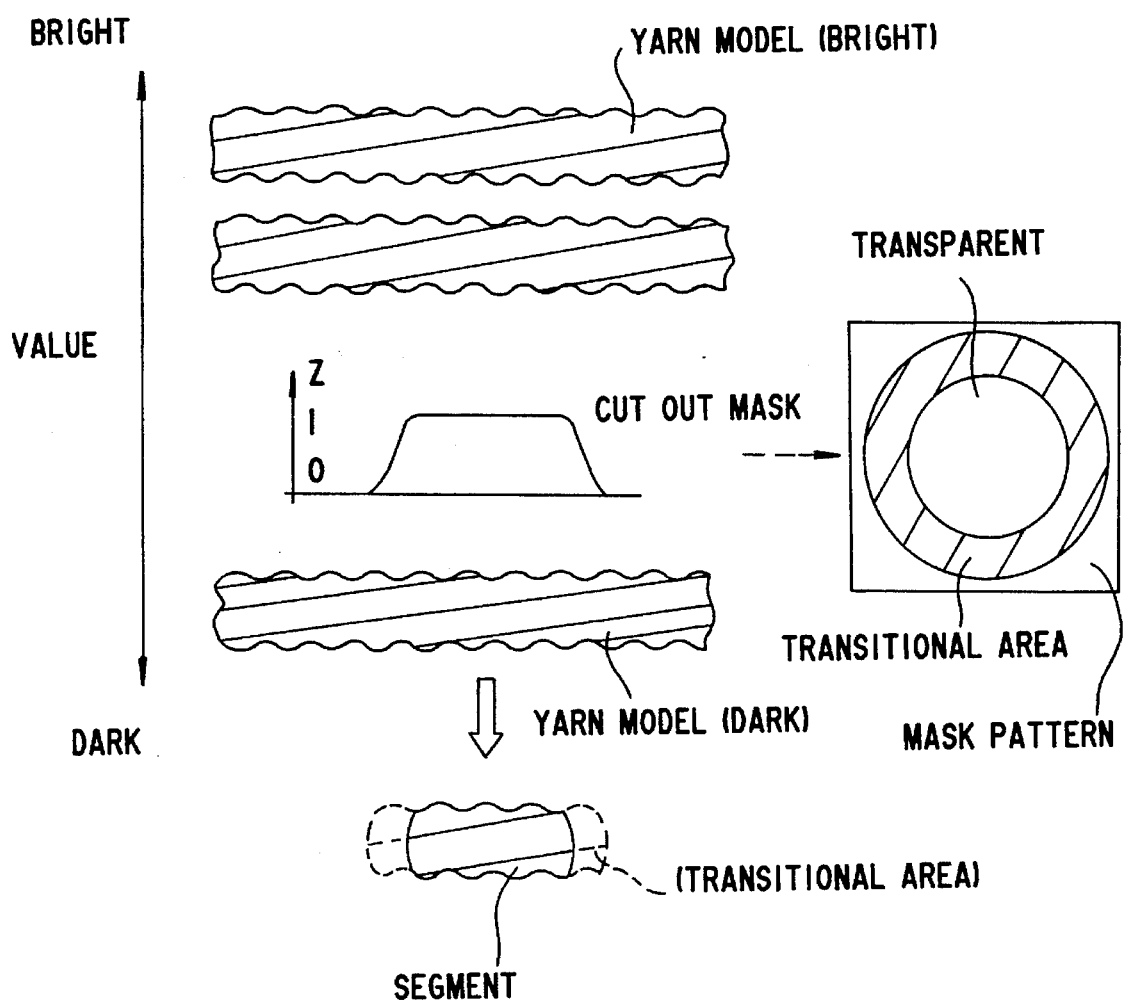
FIG. 17 is a characteristic diagram showing cutout of a segment from a yarn model in the course of the loop simulation.

Denoted at 92 is a yarn model memory which stores 160 species of yarn models for 16 yarn types and 10 models for each yarn type for example. Yarn models for one yarn type are prepared with different shading values. By changing the shading values of the yarn itself and its surroundings, various representation may be obtained; whether a loop is a face stitch or a back stitch, change in shadings along the loop, and whether the edge of the yarn is stressed or soft. According to the embodiment, the plural yarn models are prepared, and one of them is cut out based on loop characteristics, since fast simulation is desirable. However, if slow speed simulation is acceptable, only one yarn model for one yarn type may be stored and changed for its values after being cut out. Denoted at 94 is a cut out mask generator which produces circular masks as shown in FIG. 17. Mask value Z changes gradually within its peripheral transitional area for providing soft masks, and it is constant around its center. The Z value represents the transparency of a mask, when Z value is 1, the yarn model is cut out as it is, and if Z value is 0, then the yarn model is not cut out. The radiuses of the masks are changed according to the length of segments to be cut out from the yarn models. No mask is required if segment length is constant, since yarn models of the length of the segment are used as they are. As shown in FIG. 17, the yarn models are described with slant lines which represent a twist of yarn, and convexity and concavity on their surface which represent yarn fuzz. Denoted at 96 is a spline transformer for bending segments which are positioned at the top or the bottom of a loop. Of course all segments may be bent by the spline transformation. However, since the loops are almost linear between their tops and bottoms, the spline transformation for such intermediate regions are omitted. Segments for a loop are composed with a combiner 98 into a loop model which shows an image of the loop.

Denoted at 100 is a former loop mask generator which provides masks representing the overlap between a new loop and a former loop just one course before. Denoted at 102 is a loop model memory whose store space is allocated in the work memory 23 for example. The memory 102 stores temporarily each loop model produced and preserves basic loop models of frequent appearance even after the process of the loops. Denoted at 46 is the drawing processor already described, and 104 is a frame memory for loop simulation image whose memory space is allocated in the frame memories 22. The drawing processor 46 retrieves loop data of a former course from the frame memory 104 and loop models from the memory 102, it masks portions where the former loop is not covered by a new loop with a mask prepared by the generator 100, and stores the resultant image into the frame memory 104.

Loop forms do not generally fit well in squares, and their aspect ratios are not one. Therefore, the aspect ratios are compensated with the affine transformer 24 for simulating knit fabrics. The minimum transformation required is the one which converts an image with address (x,y) in the frame memory 104 to an image with new address (ax,by), thus transformations other than the affine transformation are also acceptable. Denoted at 106 is a frame memory for monitor images after the loop size compensation with the affine transformer 24. The memory space of the memory 106 is allocated in the frame memories 22, and its image is displayed on the monitor 30.

Figure 15:
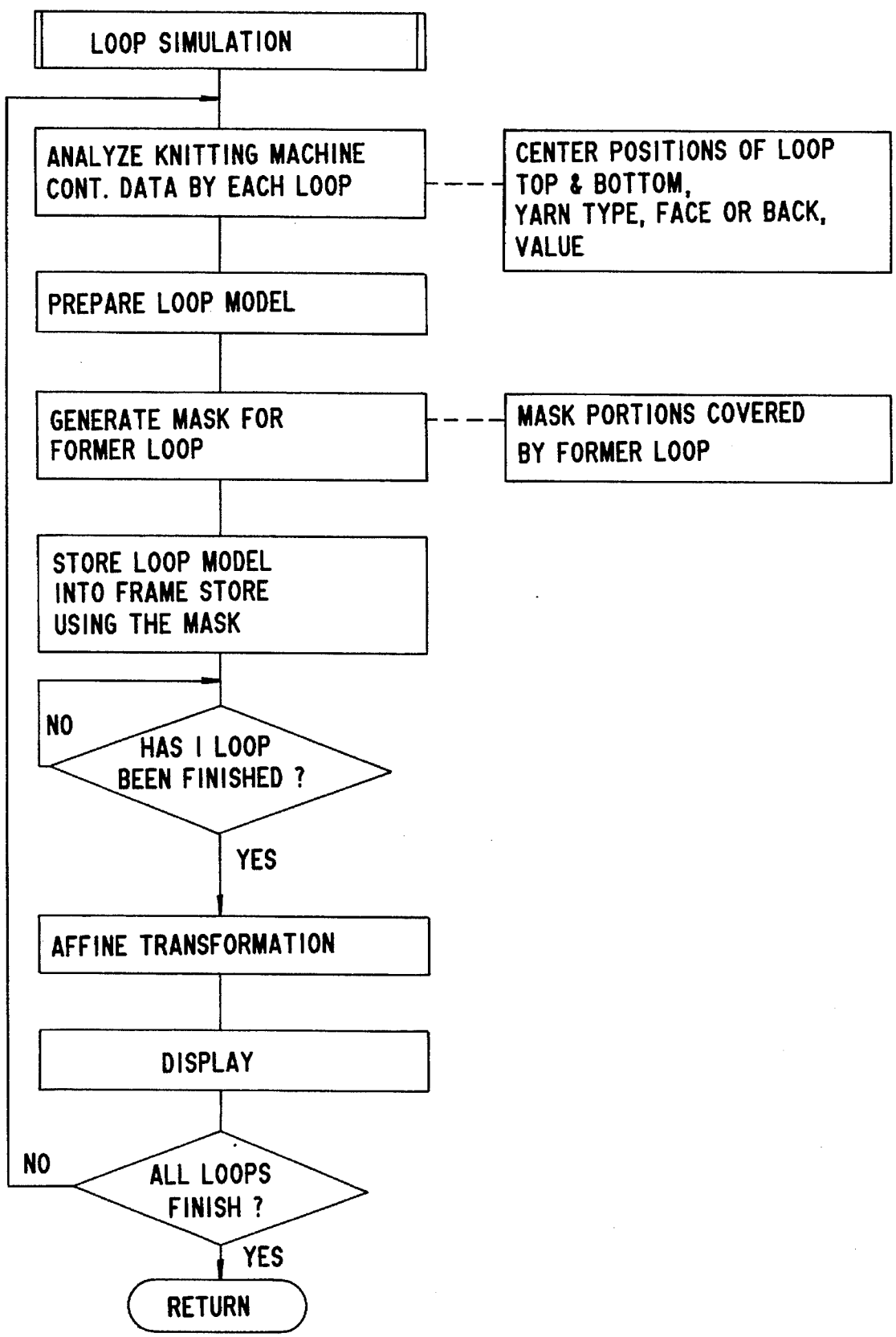
FIG. 15 is a flow chart showing an algorithm used in the loop simulator.
Figure 16:
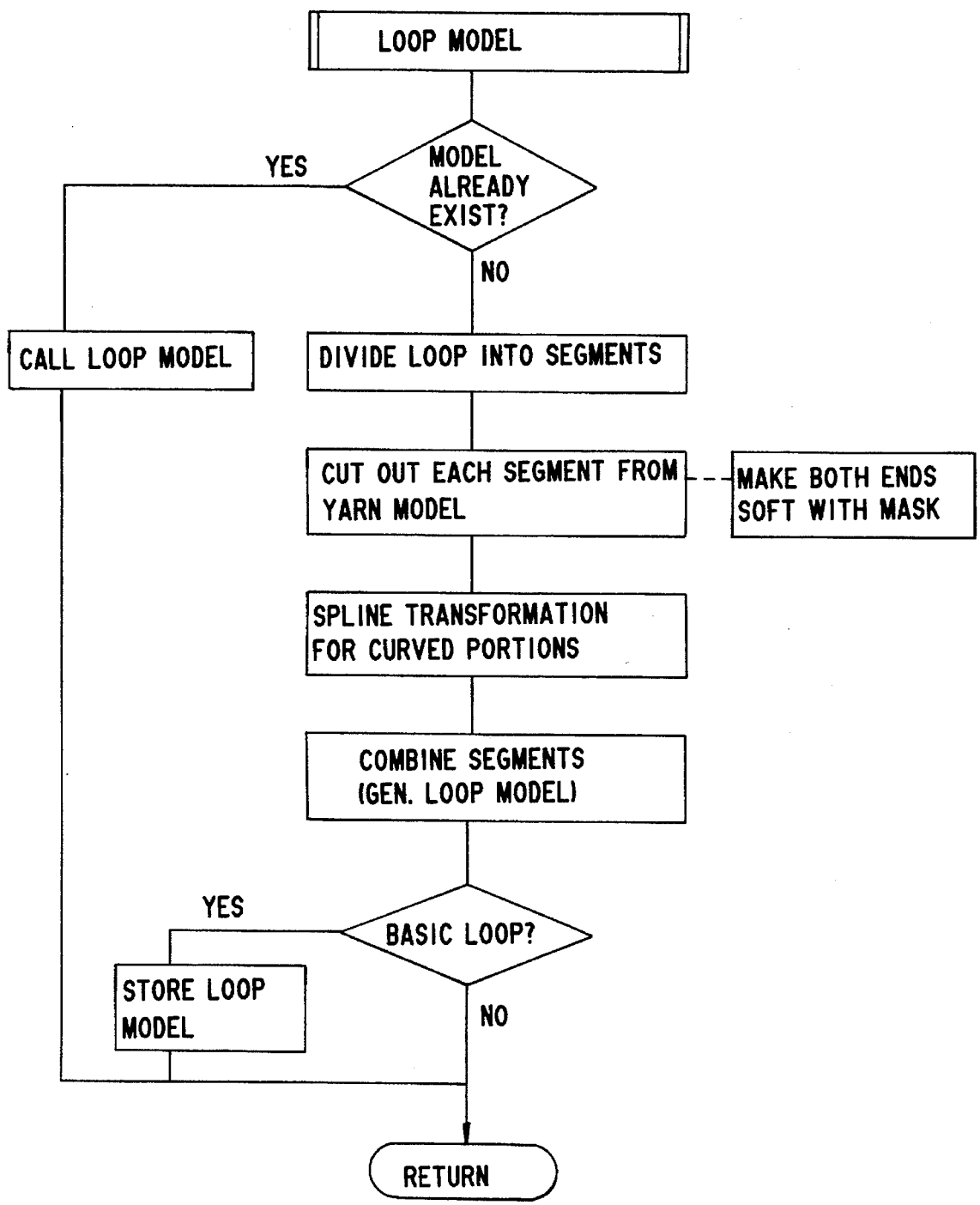
FIG. 16 is flow chart showing the generation of loop models.

FIGS. 15–20 show the loop simulation process; the main algorithm of the simulation is shown in FIG. 15. The loop form determiner 90 analyzes knitting machine control data provided by the control data generator 64, and outputs data with respect to the top center position of each loop, center position between both ends of a loop, yarn species to be used, stitch species of face or back, other stitch data, and tone values along each loop. The loop models are prepared according to these data.

FIGS. 16–19 show the preparation process of the loop models. The loop form determiner 90 checks whether the necessary loop mode has been already stored or not, and if stored, retrieves it from the memory 102. When a loop model is newly prepared for a basic loop, which is a loop without racking, the loop model is stored in the memory 102. When preparing a new loop model, the loop is divided into plural segments according to its curvature and shading values along the loop, and the segments are cut out from the yarn models in the yarn model memory 92. Once basic loop models are prepared, they are preserved in the memory 102. Therefore, most of the loop models to be produced are those with racking. For preparing such loops, while all segments may be newly produced, segments for the top and the bottom are copied from basic loop models since they are common to all loops, and only the segments between the top and the bottom are newly prepared. This shortens the processing time.

As shown in FIG. 17, the yarn model memory 92 stores about ten species of yarn models for each yarn, with various tone values and various contrast against the surroundings. Each yarn model represents yarn color, radius, twist, fuzz, and so on. The loop form determiner 90 determines the length of segments and the diameters of the corresponding masks as well, and the mask generator 94 provides the masks of the specified diameters. The masks are circular as shown in the right side of FIG. 17 for example, and have transitional area on their periphery for softening them. Where mask value Z is equal to 1, a yarn model is cut out as it is, and where Z is equal to 0, the yarn model is not cut out. At the central portion of the masks, the Z value is equal to 1, it is 0 outside the masks, and it decreases gradually from 1 to 0 as it goes outward within the peripheral transitional area. As shown at the bottom of the figure, in the center of a mask, a yarn model is cut out as it is, and it is cut out softly in its periphery as shown with broken lines.

The top and the both ends of a loop have curvature, while the intermediate portions between them are almost linear. So the top and the both ends are smoothly bent by the spline transformation. Then segments are composed with the combiner 98 into a loop model. Portions in a loop have different tone values according to the stitch species such as face stitch or back stitch as well as the positions along the loop. The top portion is semicircular around its curvature center C1, and the bottom portions are bent outward from their focal point C2, as shown in FIG. 18. Those segments are bent with the spline transformer 96 for smooth bending. While all segments of a loop may be treated with the spline transformation, portions between the top and the both ends are linearly interpolated according to the embodiment.

If two segments are simply combined, an edge would appear at the boundary between the two. For that reason, both ends of each segment are softened with the mask shown in FIG. 17 before being combined. As shown in FIG. 19, the values of the segments S2 and S3 decrease gradually along the boundary between them so that the two segments complement each other and are smoothly connected.

After a loop model is generated, the mask generator 100 generates a former loop mask as shown in FIG. 20. The mask protects the exposed portions of a former loop not covered with a new loop. Mask value Z is equal to 1 where the former loop is masked and therefore preserved, 0 where the former loop is not masked, and it changes gradually between them. After the mask preparation, the drawing processor 46 retrieves image data for the former loop from the frame memory 104 and the loop model from the memory 102, combines them with the mask, and stores the combined image into the frame memory 104.

Although the image data in the frame memory 104 simulate a knit fabric and its loops in detail, no compensation for the aspect ratios of loops has been done. Therefore, the affine transformer 24 compensates the loops with their aspect ratios and stores the resultant image into the frame memory 106 for displaying it on the monitor 30. Thus knit fabrics composed of various loops are accurately simulated in terms of the color values, contrast against the surroundings, forms, and overlap between the loops, without knitting a real knit fabric or scanning a loop image of a fabric using a scanner. Furthermore, if the knitting machine control data include some inconsistency which would result in an error in the fabric, such as a drop stitch, the user may observe it on the monitor 30, since the simulation image is based upon the knitting machine control data and inconsistent stitches may not be simulated. During the loop simulation, loops are analyzed, treated with the affine transformation, and displayed on the monitor 30 one by one, and the number of the loops on the monitor accumulates accordingly. Consequently, the loops which can not be knitted are easily observed from the monitor image.

FIGS. 21–23 show the mesh mapping process where a mannequin wears the loop simulation image. In FIG. 21, denoted at 110 is a mapping processor, 106 is the frame memory where the loop simulation image after the aspect ratio compensation is stored, 112 is a frame memory which stores a mannequin image with background, 114 is a frame memory which stores monochrome shading image of the mannequin, 116 is a frame memory which stores a mask for the mesh mapping, 46 is the drawing processor already described and denoted at 118 is a frame memory for storing a resultant image of the mesh mapping. The memories 106, 112, and 118 are full color memories with 24 bits depth, and the memories 114 and 116 are monochrome memories with 8 bits depth for example.

During the mesh mapping process, the loop simulation image after the aspect ratio compensation is stored in the frame memory 106. A mannequin image, its monochrome shading image, and a mask image are stored in the frame memories 112, 114, and 116 respectively. A mannequin image may be produced by scanning a photo print of a real mannequin or by drawing the image with the stylus 16, and it is subsequently converted into a monochrome image and stored in the frame memory 114. For producing a mask image, portions for a simulated fabric on the mannequin is retrieved from the monochrome image and filled with mask values for example.

Then a designer maps several major points both on the loop simulation image and on the mannequin image with the stylus 16 so that they correspond with each other. The mapping points are shown with 0 mark in FIG. 21, and they are connected by two sets of frameworks generated with the mapping processor 110: one for the loop simulation image and the other for the mannequin image. A square area in the loop simulation image circumscribed by mapping points S1, S2, S3, and S4 shown on the left side of FIG. 22 is distorted in the mannequin image as shown on the right side of the figure. The drawing processor 46 retrieves the loop simulation image data and the mannequin image data from the frame memories 106 and 112 segment by segment circumscribed by the frameworks. While scanning line by line from the top solid line through the intermediate broken line to the bottom solid line in the figure, the processor 46 interpolates pixels to be created and to be omitted with the mapping process, and generates the distorted image. When a pixel is omitted, it is preferable to disperse its pixel value into the surrounding pixels with the average of those pixel values. Pixel data P in the distorted image, after the mesh mapping, is given by formula (1), where P1 is pixel data in the loop simulation image, P2 is pixel data in the mannequin image, P3 is pixel data in the monochrome mannequin image, and Z is pixel data in the mask image.

$$P = P1 \cdot P3 \cdot Z + (1-Z) \cdot P2 \qquad (1)$$

The resultant P value is written into the frame memory 118 and displayed on the monitor 30. When an image in the frame memory 118 is printed out with a color printer, a hard copy for a presentation may be obtained. While the image in the frame memory 118 has no mesh, it may have the mesh.

Thus, a designed fabric is virtually worn on a mannequin without knitting the real fabric. The designed knit fabric is represented by P1 values, the shadings in the mannequin image is represented by P3 values, the area to be covered by the simulated fabric is represented by Z values, and the rest of the mannequin image, not covered by the loop simulation image, such as the head and the hands of the mannequin and backgrounds such as a wall and furniture is represented by P2 values. Therefore, a stereo graphic image can be obtained by putting a plane loop simulation image on the mannequin with its form and shadings reflected on the image, and folds and other three dimensional characters are also produced.

FIG. 24 shows an entire knit design system which unites the features in FIGS. 1–23. In the figure, denoted at 120 is the knit paint system, and denoted at 122 is the loop simulation system, both of which are already described. In FIG. 24, some components such as the data storage regions 32, 34, and 36 are independently shown apart from the knit paint system 120.

The new feature shown in FIG. 24 is to combine dyeing machines 124 and knitting machines 128 into the design system with a local area network for example, and they are operated by knitting machine control data and other instructions from the design system. It is preferable to have plural design systems and more number of knitting machines 128 which are used as the common servers of the design systems. Then plural knitting machines 128 are adequately allocated for mass production, small lot and multi-product production and test production respectively so that effective performance in each area of the production is enabled. The dyeing machines 124 are assigned to produce and supply yarn in shortage or out of stock automatically upon the request of the control data generator 64.

According to the system shown in FIG. 24, an operator measures the size of a model for example, produces dress pattern data with the selector 58, and produces design data of a fabric with the knit paint system 120. The design data are evaluated with the loop simulation system 122 and are further evaluated three dimensionally with the mannequin in the simulation image through the mesh mapping unit 26. If the design is found unsatisfactory, the designer may easily return to the knit paint process. Design data thus completed are divided into three types of data comprising intarsia, jacquard, and structures, and they are separately stored. Therefore, alterations of designs are easy, since only the necessary parts of a design such as an intarsia or a jacquard part may be retouched, and libraries of existing designs may easily be utilized. With such a library, for example, an operator may refer to an existing design A with respect to some structural stitch design, and another design B with respect to an intarsia design, After the evaluation of a design, one of the knitting machines 128 produces test samples for basic sizes selected among the size variations and provides real samples of a sweater design for example. Virtual images on the monitor produced with the loop simulation system 122 or the mesh mapping unit 26 are used as samples for other size variations. Samples of versions with different patterns or colors are similarly produced through the loop simulation or the mesh mapping. Thus real samples and quasi-samples are produced just after a design is completed. And when its production is determined, it may be started immediately by allocating a necessary number of the knitting machines 128. Therefore, stock of knit fabrics and leading time before production are almost unnecessary.

The system shown in FIG. 24 enables to produce custom-made fabrics such as sweaters in a retail store. A salesclerk measures the size of a customer, then selects the most fitting dress pattern from registered patterns with the dress pattern selector 58, and designs according to the request of the customer with the knit paint system 120. The design is checked with the loop simulation system 122 whether it is satisfactory or not and whether or not the design can really be knitted. Then a virtual mannequin of similar size to the customer wears the loop simulated design with the mesh mapping unit 26. If the customer is satisfied with the quasi-sample, a knitting machine 128 is instructed to knit the design through a telephone line for example. Thus a custom-made fabric is knitted on the spot.

We claim:

1. A knit design system, comprising:

at least a frame memory for storing at least two separate images representing knitting data, said knitting data specifying stitch types of loops of a knit fabric, wherein the at least two separate images form a knit design;

a monitor for independently displaying each separate image of said at least two separate images; and an external input means for independently modifying said each separate image and for inputting said each separate image into said frame memory.

2. A knit design system as claimed in claim 1, wherein said at least two separate images comprises at least three separate images of an intarsia image, a jacquard image, and at least one other image.

3. A knit design system as claimed in claim 1, wherein the loops may have an aspect ratio value being different from one, and the frame memory stores the at least two separate images in a format which neglects the aspect ratio value, said system further comprising means for compensating the separate images with respect to the aspect ratio so that the compensated separate images are displayed on the monitor and means for inputting input signals from the external input means both on the monitor where the aspect ratio is compensated and in the frame memory where the aspect ratio is not compensated.

4. A knit design system in claim 3, further comprising a combiner for composing the separate images into a composed image so that the composed image is displayed on the monitor.

5. A knit design system in claim 3, wherein the means for compensating the aspect ratio is an affine transformer.

6. A knit design system in claim 3, further comprising means for storing a polka dot pattern and a standard point for the pattern without the compensation of the aspect ratio for both the pattern and the standard point, wherein the compensation means compensates the aspect ratio for both the pattern and the standard point so that they are displayed on the monitor after the compensation, and means for copying the polka dot pattern into at least one of the separate images in the frame memory by designated the position of the standard point on the monitor.

7. A knit design system in claim 3, comprising further comprises means for designating on the monitor a repetition area where a repetition pattern is to be arranged, means for designing at least a unit of the repetition pattern within the repetition area on the monitor, and means for copying the unit within the repetition area repeatedly and storing the repeated units into the frame memory.

8. A knit design system in claim 3, further comprising means for generating a straight line and displaying the straight line on the monitor, based upon the designation of two points with the external input means on the monitor and means for copying the straight line into the frame memory.

9. A knit design system in claim 1, comprising further loop form determining means for determining the yarn species, the loop form, and the loop position of each loop of the knit fabric, values along the loop, and overlap of one loop and another loop, yarn model storing means for storing at least a yarn model for each yarn species to be used in the knit fabric, loop model generating means for producing plural segments by cutting out at least one of the yarn model, giving the segments the values along the loop, bending the segments according to the loop form, and composing the segments into a loop model, a frame memory means for storing a simulation image of the knit fabric, said image comprising plural loop models positioned at the loop positions determined by the loop form determining means, mask generating means for generating at least one mask representing the overlap of a loop and said another loop according to the determined overlap, and drawing means for drawing said each loop into the frame memory means with the mask while preserving portions of said another loop to be exposed, wherein the monitor is adapted for displaying the simulation image.

10. A knit design system in claim 9, further comprising loop model storing means for storing the loop models that have high appearance frequency.

11. A knit design system in claim 9, further comprising another frame memory means for storing a mannequin image, and a mapping means for mapping the simulation image onto the mannequin image.

12. A knit design system comprising at least a frame memory for storing the design image of a knit fabric being accessible by address designation, the design image including plural loops without being compensated their aspect ratio, a monitor for displaying the design image being accessible by address designation, at least an external input means for modifying the design image, aspect ratio compensation means for compensating the design image according to the aspect ratio so that an image after the compensation is displayed on the monitor means for inputting input data from the external input means both on the monitor where the aspect ratio is compensated and in the frame memory where the aspect ratio is not compensated and wherein the means for inputting data comprises an internal address generating means for generating an address in the frame memory and a monitor address generating means for generating an address in the monitor.

13. A knit design system as claimed in claim 12 further comprising a region of the memory is allocated for storing monitor data.

14. A knit design system as claimed in claim 12 wherein the monitor address generating means comprises means for converting address in the frame memory provided by the internal address generating means into the monitor address in the monitor.

15. A knit design system comprising;

loop form determining means for determining the yarn species to be used, the loop form, and the loop position of each loop, values along the loop, and overlap of one loop and another loop, according to design data of a knit fabric, yarn model storing means for storing at least a yarn model for each yarn species in the knit fabric, loop model generating means for producing segments by cutting out at least one of the yarn model, giving the segments the values along the loop, bending the segments according to the loop form, and composing the resultant segments into a loop model, a frame memory means for storing the loop simulation image of the knit fabric, said image comprising plural loop models positioned according to the determined loop positions, mask generating means for generating a mask representing the overlap of a loop and another loop according to the determined overlap, drawing means for drawing each loop model into the frame memory means with at least one said mask while preserving portions of said another loop to be exposed, and a monitor for displaying the loop simulation image.

16. A knit design system comprising;

a frame memory means for storing the design image of a knit fabric, wherein the knit fabric has plural loops, and each loop is allocated with a predetermined number of pixels in the frame memory, input means for inputting a dress pattern image into the frame memory as a part of the design image, means for modifying the design image memory, means for compensating the aspect ratio of the loops for the design image for producing a monitor image, a monitor for displaying the monitor image, means for converting the design image into the control data of a knitting machine, loop simulation means for generating a quasi image of the knit fabric to be knitted and for displaying the quasi image on the monitor based upon the control data, the loop simulation means comprising a memory for storing yarn model images, generating means for generating a loop model image representing forms and values of the loops using at least one of the yarn model images, and another frame memory means for storing the loop simulation image including the loop model images during the loop simulation, and mesh mapping means for making a mannequin image in the loop simulation image with mapping the loop simulation image onto the mannequin image.

17. A knit design method for designing a knit fabric with displaying the design image of the knit fabric on a monitor, comprising storing at least two separate design images into which the design image is divided according to stitch species in the design, displaying one of the separate images on the monitor, and displaying a composed image of the separate images on the monitor.

* * * * *